(12) United States Patent
Rusanovskyy et al.

(10) Patent No.: US 9,998,726 B2
(45) Date of Patent: Jun. 12, 2018

(54) APPARATUS, A METHOD AND A COMPUTER PROGRAM FOR VIDEO CODING AND DECODING

(71) Applicant: Nokia Technologies Oy, Espoo (FI)

(72) Inventors: Dmytro Rusanovskyy, Lempäälä (FI); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 131 days.

(21) Appl. No.: 13/916,977

(22) Filed: Jun. 13, 2013

(65) Prior Publication Data

US 2013/0342644 A1   Dec. 26, 2013

Related U.S. Application Data

(60) Provisional application No. 61/662,076, filed on Jun. 20, 2012.

(51) Int. Cl.
*H04N 13/00* (2018.01)
*H04N 19/597* (2014.01)
*H04N 19/42* (2014.01)

(52) U.S. Cl.
CPC ......... *H04N 13/0048* (2013.01); *H04N 19/42* (2014.11); *H04N 19/597* (2014.11)

(58) Field of Classification Search
CPC ............................ H04N 13/0048; H04N 19/46
See application file for complete search history.

(56) References Cited

U.S. PATENT DOCUMENTS

| | | |
|---|---|---|
| 2009/0290643 A1 | 11/2009 | Yang |
| 2010/0091858 A1 | 4/2010 | Yang |
| 2011/0268177 A1* | 11/2011 | Tian et al. ............... 375/240.01 |
| 2012/0092452 A1* | 4/2012 | Tourapis et al. ................ 348/43 |
| 2013/0176390 A1* | 7/2013 | Chen et al. ..................... 348/43 |

FOREIGN PATENT DOCUMENTS

CN          101647279          2/2010

OTHER PUBLICATIONS

International Search Report and Written Opinion received for corresponding Patent Cooperation Treaty Application No. PCT/FI2013/050662, dated Oct. 25, 2013, 12 pages.

(Continued)

*Primary Examiner* — Zhubing Ren
(74) *Attorney, Agent, or Firm* — Alston & Bird LLP

(57) ABSTRACT

There is disclosed a method, apparatus and computer program product in which a view synthesis prediction utilizes a depth map, disparity information or other ranging information of a co-located reference frame in another view. A first uncompressed texture block of a first texture picture representing a first view and ranging information associated with the first uncompressed texture block are obtained. Disparity information with reference to a second view is derived on the basis of the ranging information. Reference samples of the second view are obtained on the basis of the disparity information. A view synthesis prediction is performed by using the reference samples to obtain a reference block for encoding the first uncompressed texture block.

16 Claims, 8 Drawing Sheets

(56) References Cited

OTHER PUBLICATIONS

Muller et al., "3-D Video Representation Using Depth Maps", Proceedings of the IEEE, vol. 99 No. 4, Apr. 2011, pp. 643-656. Retrieved from the Internet: <URL: http://iphone.hhi.de/wiegand/assets/pdfs/3d-vedeo-depth-maps.pdf> section III, Fig. 8.

Tzovaras D. et al., "Disparity Field and Depth Map Coding for Multiview 3D Image Generation", Signal Processing: Image Communiation, vol. 11, No. 3, 1998, pp. 205-230. Retrieved from the internet: <URL: http//www.sciencedirect.com/science/article/pii/S0923596597000295>.

Shao et al., "Asymmetric coding of multi-view plus depth based 3-D video for view rendering", IEEE Transactions on Multimedia, vol. 14, No. 1, Feb. 2012, pp. 157-167. Retrieved from the internet: <URL: http://icserv.kjist.ac.kr/mis/publications/data/2012/TMM2012_Feng.pdf>.

Rusanovskyy et al., "Depth-based coding of MVD data for 3D video extension of H.264/AVC", 3D Research, vol. 4 issue 2, Jun. 2013, 10 pages. Retrieved from the internet: <DOI: 10.1007/3Dres.02(2013)6>.

Office Action for Russian Application No. 2014153261 dated Apr. 13, 2016.

Muller, K. et al., *3-D Video Representation Using Depth Maps*, Proceedings of the IEEE, vol. 99, No. 4 (Apr. 2011) 643-656.

Office Action for corresponding Canadian Application No. 2,876,344 dated Jan. 28, 2016.

Extended European Search Report for corresponding European Application No. 13817171.5 dated Jan. 7, 2016, 8 pages.

Hannuksela, M. M. et al., *Suggestion for a depth-enhanced multiview video coding extension to H.264 Annex A: Nokia 3DV Test Model (3DV-TM) Codec Description and Simulation Results*, Video Coding Experts Group (VCEG) ITU-T SG 16, 44$^{th}$ Meeting (Feb. 2012) 1-14.

Hannuksela, M. M., *Test Model for AVC-based 3D video coding: editor's update*, ISO/IEC JTC1/SC29/WG11 MPEG2012/M24889 (May 2012) 1-19.

Office Action for Korean Application No. 2015-7001333 dated Nov. 5, 2015.

Office Action for corresponding Chinese Application No. 201380042551.8 dated Apr. 5, 2017, 15 pages.

Office Action for corresponding Chinese Application No. 201380042551.8 dated Nov. 13, 2017, with English Translation, 5 pages.

Office Action for European Application No. 13817171.5 dated Feb. 7, 2018, 7 pages.

\* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Scalable video coding refers to a coding structure where one bitstream can contain multiple representations of the content at different bitrates, resolutions, frame rates and/or other types of scalability. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. Each layer together with all its dependent layers is one representation of the video signal at a certain spatial resolution, temporal resolution, quality level, and/or operation point of other types of scalability.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC can be used.

SUMMARY

Some embodiments provide a mechanism to perform a backward view synthesis prediction where a view synthesis prediction block for the current texture block of a view is formed on the basis of co-located depth/disparity block for the same view. Some embodiments specify set of encoding and decoding operations as well as operations for performing view synthesis which would allow block-based, low complexity implementation for in-loop view synthesis prediction. In some embodiments a current block of a frame of a first view is selected for encoding, and a current block of a frame of a first view is selected for encoding. Ranging information associated with a texture block of the current block is obtained. Disparity information with reference to a reference frame in a second view is derived on the basis of the ranging information, and a reference area is derived on the basis of the disparity information. A view synthesis prediction is performed by using the reference area to obtain a prediction of the current block.

According to a first aspect of the invention, there is provided a method comprising:

obtaining a first uncompressed texture block of a first texture picture representing a first view;

obtaining ranging information associated with the first uncompressed texture block;

deriving disparity information with reference to a reference frame in a second view on the basis of the ranging information;

obtaining reference samples of the second view on the basis of the disparity information;

performing a view synthesis prediction by using the reference samples to obtain a reference block for encoding the first uncompressed texture block.

According to a second aspect of the invention, there is provided an apparatus comprising at least one processor and at least one memory including computer program code, the at least one memory and the computer program code configured to, with the at least one processor, cause the apparatus to:

obtain a first uncompressed texture block of a first texture picture representing a first view;

obtain ranging information associated with the first uncompressed texture block;

derive disparity information with reference to a reference frame in a second view on the basis of the ranging information;

obtain reference samples of the second view on the basis of the disparity information;

perform a view synthesis prediction by using the reference samples to obtain a reference block for encoding the first uncompressed texture.

According to a third aspect of the invention, there is provided a computer obtain a first uncompressed texture block of a first texture picture representing a first view;

obtain ranging information associated with the first uncompressed texture block;

derive disparity information with reference to a reference frame in a second view on the basis of the ranging information;

obtain reference samples of the second view on the basis of the disparity information;

perform a view synthesis prediction by using the reference samples to obtain a reference block for encoding the first uncompressed texture block.

According to a fourth aspect of the invention there is provided an apparatus comprising:

means for obtaining a first uncompressed texture block of a first texture picture representing a first view;

means for obtaining ranging information associated with the first uncompressed texture block;

means for deriving disparity information with reference to a reference frame in a second view on the basis of the ranging information;

means for obtaining reference samples of the second view on the basis of the disparity information;

means for performing a view synthesis prediction by using the reference samples to obtain a reference block for encoding the first uncompressed texture block.

According to a fifth aspect of the invention, there is provided a method comprising:

obtaining a first encoded texture block of a first texture picture representing a first view;

obtaining ranging information associated with the first encoded texture block;

deriving disparity information with reference to a reference frame in a second view on the basis of the ranging information;

obtaining reference samples of the second view on the basis of the disparity information;

performing a view synthesis prediction by using the reference samples to obtain a reference block for decoding the first encoded texture block.

According to a sixth aspect of the invention, there is provided an apparatus comprising at least one processor and at least one memory including computer program code, the at least one memory and the computer program code configured to, with the at least one processor, cause the apparatus to:

obtain a first encoded texture block of a first texture picture representing a first view;

obtain ranging information associated with the first encoded texture block;

derive disparity information with reference to a reference frame in a second view on the basis of the ranging information;

obtain reference samples of the second view on the basis of the disparity information;

perform a view synthesis prediction by using the reference samples to obtain a reference block for decoding the first encoded texture block.

According to a seventh aspect of the invention, there is provided a computer program product including one or more sequences of one or more instructions which, when executed by one or more processors, cause an apparatus to at least perform the following:

obtain a first encoded texture block of a first texture picture representing a first view;

obtain ranging information associated with the first encoded texture block;

derive disparity information with reference to a reference frame in a second view on the basis of the ranging information;

obtain reference samples of the second view on the basis of the disparity information;

perform a view synthesis prediction by using the reference samples to obtain a reference block for decoding the first encoded texture block.

According to an eighth aspect of the invention, there is provided an apparatus comprising:

means for obtaining a first encoded texture block of a first texture picture representing a first view;

means for obtaining ranging information associated with the first encoded texture block;

means for deriving disparity information with reference to a reference frame in a second view on the basis of the ranging information;

means for obtaining reference samples of the second view on the basis of the disparity information;

means for performing a view synthesis prediction by using the reference samples to obtain a reference block for decoding the first encoded texture block.

According to a ninth aspect of the invention, there is provided a video coder configured for:

obtaining a first uncompressed texture block of a first texture picture representing a first view;

obtaining ranging information associated with the first uncompressed texture block;

deriving disparity information with reference to a reference frame in second view on the basis of the ranging information;

obtaining reference samples of the second view on the basis of the disparity information;

performing a view synthesis prediction by using the reference samples to obtain a reference block for encoding the first uncompressed texture block.

According to a tenth aspect of the invention, there is provided a video decoder configured for:

obtaining a first encoded texture block of a first texture picture representing a first view;

obtaining ranging information associated with the first encoded texture block;

deriving disparity information with reference to a reference frame in a second view on the basis of the ranging information;

obtaining reference samples of the second view on the basis of the disparity information;

performing a view synthesis prediction by using the reference samples to obtain a reference block for decoding the first encoded texture block.

DESCRIPTION OF THE DRAWINGS

For better understanding of the present invention, reference will now be made by way of example to the accompanying drawings in which.

Figure 1:
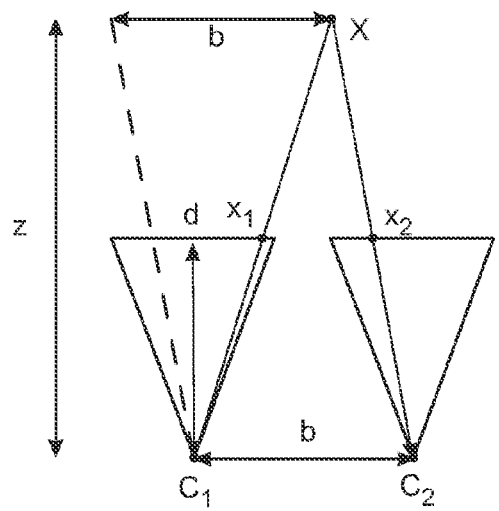
FIG. 1 shows a simplified 2D model of a stereoscopic camera setup.

DETAILED DESCRIPTION OF SOME
EXAMPLE EMBODIMENTS

In order to understand the various aspects of the invention and the embodiments related thereto, the following describes briefly some closely related aspects of video coding.

Some key definitions, bitstream and coding structures, and concepts of H.264/AVC are described in this section as an example of a video encoder, decoder, encoding method, decoding method, and a bitstream structure, wherein some embodiments may be implemented. The aspects of the invention are not limited to H.264/AVC, but rather the description is given for one possible basis on top of which the invention may be partly or fully realized.

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

Similarly to many earlier video coding standards, the bitstream syntax and semantics as well as the decoding process for error-free bitstreams are specified in H.264/AVC. The encoding process is not specified, but encoders must generate conforming bitstreams. Bitstream and decoder conformance can be verified with the Hypothetical Reference Decoder (HRD), which is specified in Annex C of H.264/AVC. The standard contains coding tools that help in coping with transmission errors and losses, but the use of the tools in encoding is optional and no decoding process has been specified for erroneous bitstreams.

The elementary unit for the input to an H.264/AVC encoder and the output of an H.264/AVC decoder is a picture. A picture may either be a frame or a field. A frame typically comprises a matrix of luma samples and corresponding chroma samples. A field is a set of alternate sample rows of a frame and may be used as encoder input, when the source signal is interlaced. A macroblock (MB) is a 16×16 block of luma samples and the corresponding blocks of chroma samples. A block has boundary samples, which consist of the samples at the top-most and bottom-most rows of samples and at the left-most and right-most columns of samples. Boundary samples adjacent to another block being coded or decoded may be used for example in intra prediction. Chroma pictures may be subsampled when compared to luma pictures. For example, in the 4:2:0 sampling pattern the spatial resolution of chroma pictures is half of that of the luma picture along both coordinate axes and consequently a macroblock contains one 8×8 block of chroma samples per each chroma component. A picture is partitioned to one or more slice groups, and a slice group contains one or more slices. A slice consists of an integer number of macroblocks ordered consecutively in the raster scan within a particular slice group.

The elementary unit for the output of an H.264/AVC encoder and the input of an H.264/AVC decoder is a Network Abstraction Layer (NAL) unit. Decoding of partially lost or corrupted NAL units is typically difficult. For transport over packet-oriented networks or storage into structured files, NAL units are typically encapsulated into packets or similar structures. A bytestream format has been specified in H.264/AVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

H.264/AVC, as many other video coding standards, allows splitting of a coded picture into slices. In-picture prediction is disabled across slice boundaries. Thus, slices can be regarded as a way to split a coded picture into independently decodable pieces, and slices are therefore elementary units for transmission.

Some profiles of H.264/AVC enable the use of up to eight slice groups per coded picture. When more than one slice group is in use, the picture is partitioned into slice group map units, which are equal to two vertically consecutive macroblocks when the macroblock-adaptive frame-field (MBAFF) coding is in use and equal to a macroblock otherwise. The picture parameter set contains data based on which each slice group map unit of a picture is associated with a particular slice group. A slice group can contain any slice group map units, including non-adjacent map units. When more than one slice group is specified for a picture, the flexible macroblock ordering (FMO) feature of the standard is used.

In H.264/AVC, a slice consists of one or more consecutive macroblocks (or macroblock pairs, when MBAFF is in use) within a particular slice group in raster scan order. If only one slice group is in use, H.264/AVC slices contain consecutive macroblocks in raster scan order and are therefore similar to the slices in many previous coding standards. In some profiles of H.264/AVC slices of a coded picture may appear in any order relative to each other in the bitstream, which is referred to as the arbitrary slice ordering (ASO) feature. Otherwise, slices must be in raster scan order in the bitstream.

NAL units consist of a header and payload. The NAL unit header indicates the type of the NAL unit and whether a coded slice contained in the NAL unit is a part of a reference picture or a non-reference picture. The header for SVC and MVC NAL units additionally contains various indications related to the scalability and multiview hierarchy.

NAL units of H.264/AVC can be categorized into Video Coding Layer (VCL) NAL units and non-VCL NAL units. VCL NAL units are either coded slice NAL units, coded slice data partition NAL units, or VCL prefix NAL units. Coded slice NAL units contain syntax elements representing one or more coded macroblocks, each of which corresponds to a block of samples in the uncompressed picture. There are four types of coded slice NAL units: coded slice in an Instantaneous Decoding Refresh (IDR) picture, coded slice in a non-IDR picture, coded slice of an auxiliary coded picture (such as an alpha plane) and coded slice extension (for SVC slices not in the base layer or MVC slices not in the base view). A set of three coded slice data partition NAL units contains the same syntax elements as a coded slice. Coded slice data partition A comprises macroblock headers and motion vectors of a slice, while coded slice data partition B and C include the coded residual data for intra macroblocks and inter macroblocks, respectively. It is noted that the support for slice data partitions is only included in some profiles of H.264/AVC. A VCL prefix NAL unit precedes a coded slice of the base layer in SVC and MVC bitstreams and contains indications of the scalability hierarchy of the associated coded slice.

A non-VCL NAL unit of H.264/AVC may be of one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas the other non-VCL NAL units are not necessary for the reconstruction of decoded sample values and serve other purposes presented below.

Many parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for H.264/AVC Real-time Transport Protocol (RTP) sessions. If parameter sets are transmitted in-band, they can be repeated to improve error robustness.

A SEI NAL unit of H.264/AVC contains one or more SEI messages, which are not required for the decoding of output pictures but assist in related processes, such as picture output timing, rendering, error detection, error concealment, and resource reservation. Several SEI messages are specified in H.264/AVC, and the user data SEI messages enable organizations and companies to specify SEI messages for their own use. H.264/AVC contains the syntax and semantics for the specified SEI messages but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture in H.264/AVC consists of the VCL NAL units that are required for the decoding of the picture. A coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded.

In H.264/AVC, an access unit consists of a primary coded picture and those NAL units that are associated with it. The appearance order of NAL units within an access unit is constrained as follows. An optional access unit delimiter NAL unit may indicate the start of an access unit. It is followed by zero or more SEI NAL units. The coded slices or slice data partitions of the primary coded picture appear next, followed by coded slices for zero or more redundant coded pictures.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit always results in one decoded picture consisting of one or more decoded view components. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture in MVC is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. A closed GOP is such a group of pictures in which all pictures can be correctly decoded when the decoding starts from the initial intra picture of the closed GOP. In other words, no picture in a closed GOP refers to any pictures in previous GOPs. In H.264/AVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC indicates whether a particular picture is a reference picture for inter prediction of any other picture. Pictures of any coding type (I, P, B, SP) can be reference pictures or non-reference pictures in H.264/AVC. The NAL unit header indicates the type of the NAL unit and whether a coded slice contained in the NAL unit is a part of a reference picture or a non-reference picture.

There is an ongoing video coding standardization project for specifying a High Efficiency Video Coding (HEVC) standard. Many of the key definitions, bitstream and coding structures, and concepts of HEVC are the same as or similar to those of H.264/AVC. Some key definitions, bitstream and coding structures, and concepts of HEVC are described in this section as an example of a video encoder, decoder, encoding method, decoding method, and a bitstream structure, wherein some embodiments may be implemented. The aspects of the invention are not limited to HEVC, but rather the description is given for one possible basis on top of which the invention may be partly or fully realized.

Similarly to H.264/AVC, an HEVC bitstream consists of a number of access units, each including coded data associated with a picture. Each access unit is divided into NAL units, including one or more VCL NAL units (i.e., coded slice NAL units) and zero or more non-VCL NAL units, e.g., parameter set NAL units or Supplemental Enhancement Information (SEI) NAL units. Each NAL unit includes a NAL unit header and a NAL unit payload. In a draft HEVC standard, a two-byte NAL unit header is used for all specified NAL unit types. The first byte of the NAL unit header contains one reserved bit, a one-bit indication nal_ref_idc primarily indicating whether the picture carried in this access unit is a reference picture or a non-reference picture, and a six-bit NAL unit type indication. The second byte of the NAL unit header includes a three-bit temporal_id indication for temporal level and a five-bit reserved field (called reserved_one_5 bits) required to have a value equal to 1 in a draft HEVC standard. The five-bit reserved field is expected to be used by extensions such as a future scalable and 3D video extension. It is expected that these five bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_one_5 bits for example as follows: LayerId=reserved_one_5 bits−1.

In a draft HEVC standard, some key definitions and concepts for picture partitioning are defined as follows. A partitioning is defined as the division of a set into subsets such that each element of the set is in exactly one of the subsets.

Video pictures can be divided into coding units (CU) covering the area of the picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size may be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit has prediction information associated with it defining what kind of a prediction is to be applied for the pixels within that prediction unit (e.g. motion vector information for inter predicted prediction units and intra prediction directionality information for intra predicted prediction units). Similarly, each transform unit is associated with information describing the prediction error decoding process for the samples within the transform unit (including e.g. DCT coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in a bitstream allowing the decoder to reproduce the intended structure of these units.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may be also referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (e.g. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. H.264/AVC and HEVC, as many other video compression standards, divides a picture into a mesh of rectangles, for each of which a similar block in one of the reference pictures is indicated for inter prediction. The location of the prediction block is coded as a motion vector that indicates the position of the prediction block compared to the block being coded. In order to represent motion vectors efficiently those may be coded differentially with respect to block specific predicted motion vectors. In many video codecs the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or from co-located blocks in a temporal reference picture. Moreover, many high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P or slices may be uni-predicted or intra-predicted. The reference pictures for a bi-predictive picture are not limited to be the subsequent picture and the previous picture in output order, but rather any reference pictures can be used.

In many coding standards, such as H.264/AVC and HEVC, one reference picture list, referred to as reference picture list 0, is constructed for P and SP slices, and two reference picture lists, list 0 and list 1, are constructed for B slices. For B slices, when prediction in forward direction may refer to predicting from a reference picture in reference picture list 0, and prediction in backward direction may refer to predicting from a reference picture in reference picture list 1, even though the reference pictures for prediction may have any decoding or output order relation to each other or to the current picture. In some embodiments the reference pictures which are earlier than a current picture in playback or output order are put into the list 0 according to the decreasing order, and the reference pictures which are later than the current picture are put into the list 1 according to the increasing order. The reference pictures may be sorted according to the distance between the reference picture and the current picture.

Since multiview video provides codecs the possibility to utilize inter-view redundancy, decoded inter-view frames may be included in the reference picture buffer as well. Weighted prediction. Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU.

Many syntax elements in video coding standards, such as H.264/AVC and HEVC, are entropy-coded in the encoder and entropy-decoded in the decoder. The entropy coding may be done for example using context adaptive binary arithmetic coding (CABAC), context-based variable length coding, Huffman coding, or any similar entropy coding.

Many video encoders utilize the Lagrangian cost function to find rate-distortion optimal coding modes, for example the desired macroblock mode and associated motion vectors. This type of cost function uses a weighting factor or $\lambda$ to tie together the exact or estimated image distortion due to lossy coding methods and the exact or estimated amount of information required to represent the pixel/sample values in an image area. The Lagrangian cost function may be represented by the equation:

$$C=D+\lambda R$$

where C is the Lagrangian cost to be minimised, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

In some coding formats and codecs, a distinction is made between so-called short-term and long-term reference pictures. This distinction may affect some decoding processes such as motion vector scaling in the temporal direct mode or implicit weighted prediction. If both of used reference pictures for the temporal direct mode are short-term reference pictures, the motion vector used in the prediction may be scaled according to the POC difference between the current picture and each of the reference pictures. However, if at least one reference picture for the temporal direct mode is a long-term reference picture, default scaling of the motion vector is used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control requires the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the a reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in HEVC, a combined list (List C), also referred to as the merge list, is constructed after the final reference picture lists (List 0 and List 1) have been constructed. The combined list may be used for uni-prediction (also known as uni-directional prediction) within B slices.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Since multiview video provides encoders and decoders the possibility to utilize inter-view redundancy, decoded inter-view frames may be included in the reference picture list(s) as well.

The combined list in HEVC may be constructed as follows. If the modification flag for the combined list is zero, the combined list is constructed by an implicit mechanism; otherwise it is constructed by reference picture combination commands included in the bitstream. In the implicit mechanism, reference pictures in List C are mapped to reference pictures from List 0 and List 1 in an interleaved fashion starting from the first entry of List 0, followed by the first entry of List 1 and so forth. Any reference picture that has already been mapped in List C is not mapped again. In the explicit mechanism, the number of entries in List C is signaled, followed by the mapping from an entry in List 0 or List 1 to each entry of List C. In addition, when List 0 and List 1 are identical the encoder has the option of setting the ref_pic_list_combination_flag to 0 to indicate that no reference pictures from List 1 are mapped, and that List C is equivalent to List 0.

Typical high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU comprises 1) The information whether 'the PU is uni-predicted using only reference picture list 0' or 'the PU is uni-predicted using only reference picture list 1' or 'the PU is bi-predicted using both reference picture list 0 and list 1' 2) Motion vector value corresponding to the reference picture list 0 3) Reference picture index in the reference picture list 0 4) Motion vector value corresponding to the reference picture list 1 5) Reference picture index in the reference picture list 1. Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

A syntax structure for reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

Figures 7A, 7B:
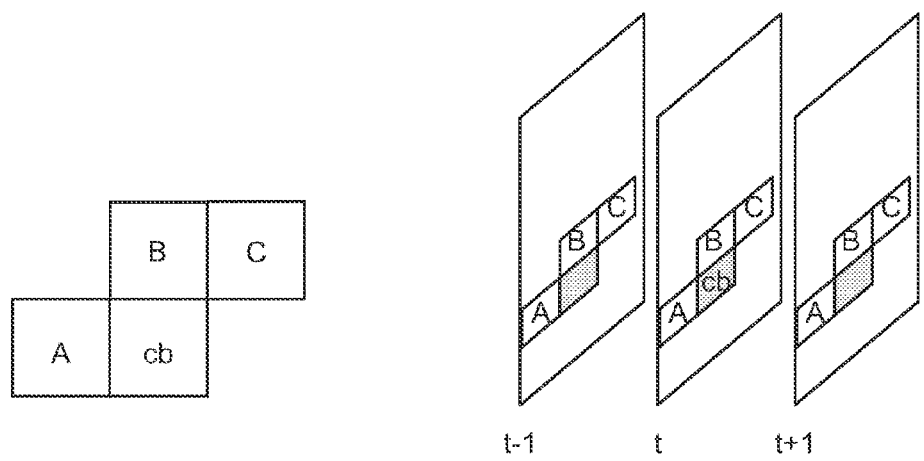
FIG. 7a shows spatial neighborhood of the currently coded block serving as the candidates for intra prediction.
FIG. 7b shows temporal neighborhood of the currently coded block serving as the candidates for inter prediction.

Motion vector (MV) prediction specified in H.264/AVC and its MVC extension utilizes correlation which may be present in neighboring blocks of the same image (spatial correlation) or in the previously coded image (temporal correlation). FIG. 7a shows the spatial neighborhood of the currently coded block (cb) and FIG. 7b shows the temporal neighborhood of the currently coded block which serves as a candidate for a motion vector prediction in H.264/AVC.

Motion vectors of the current block cb may be estimated through the motion estimation and motion compensation process and may be coded with differential pulse code modulation (DPCM) and transmitted in the form of the residual between the motion vector prediction (MVp) and the actual motion vector MV as MVd(x,y)=MV(x,y)−MVp(x,y).

A median value of the motion vectors of the macroblock partitions or subpartitions immediately above (block B), diagonally above and to the right (block C), and immediately left (block A) of the current partition or sub-partition may be computed.

In some embodiments the motion vector prediction MVp estimation may be specified as following:

When only one of the spatial neighboring blocks (A, B, C) has identical reference index as the current block, then $$MVp = mvLXN \qquad (1)$$

When more than one or no neighboring blocks (A, B, C) have identical reference index as the current block, then $$MVp = \text{median}\{mvLXA, mvLXB, mvLXC\}, \qquad (2)$$

where mvLXA, mvLXB, mvLXC are motion vectors (without reference frame id) of the spatially neighboring blocks.

In some situations a P_SKIP mode or a B_SKIP mode may be utilized. In the P_SKIP mode a reference frame index of the current block is always 0 and the list which is utilized is the first list 0 (refIdxL0=0). Motion vectors are estimated by only using the blocks immediately left (block A) and immediately above (block B) of the current block. If the block immediately left and immediately above do not exist a zero-value motion vector prediction MVp is selected. Since no MV=MVp in P_SKIP mode, no motion vector difference dMV is transmitted.

In the B_SKIP mode two motion vector prediction estimation processes may be utilized: a spatial direct mode in which motion vector prediction is computed from spatial neighboring blocks as illustrated in FIG. 7a; or a temporal direct mode in which motion vector prediction is computed from temporal neighboring blocks as illustrated in FIG. 7b.

The motion vector prediction process includes estimation of the following values:

a. reference indices refIdxL0, refIdxL1
b. motion vectors mvL0 and mvL1.

In the spatial direct mode the process of reference index prediction and motion vector prediction is run independently for both reference picture lists (Reference Picture List 0, Reference Picture List 1). The minimal positive reference index is selected in each of the lists and a motion vector prediction process is applied for each reference picture list to produce mvpL0 and mvpL1.

Each component of the motion vector prediction mvpLX is given by the median of the corresponding vector components of the motion vector mvLXA, mvLXB, and mvLXC:

$$mvpLX[0] = \text{Median}(mvLXA[0], mvLXB[0], mvLXC[0])$$

$$mvpLX[1] = \text{Median}(mvLXA[1], mvLXB[1], mvLXC[1]).$$

In the temporal direct mode the motion vectors of the current block to the list 0 and list 1 may be calculated through temporal interpolation of motion vectors from neighboring (in temporal direction) blocks. The picture order count (POC) distance from the current frame to the referenced frame may be utilized as a factor of interpolation.

MV0=MVc*(TDb/TDd)

MV1=MVc*(TDb−TDD)/TDd, where TDb is the picture order count distance between the current frame and the reference frame in list 0; TDd is the picture order count distance between referenced frames in list 0 and list 1; and MVc is the motion vector of the co-located block from the reference picture list 0.

Next, for better understanding the embodiments of the invention, some aspects of three-dimensional (3D) multiview applications and the concepts of depth and disparity information closely related thereto are described briefly.

Stereoscopic video content consists of pairs of offset images that are shown separately to the left and right eye of the viewer. These offset images are captured with a specific stereoscopic camera setup and it assumes a particular stereo baseline distance between cameras.

FIG. 1 shows a simplified 2D model of such stereoscopic camera setup. In FIG. 1, C1 and C2 refer to cameras of the stereoscopic camera setup, more particularly to the center locations of the cameras, b is the distance between the centers of the two cameras (i.e. the stereo baseline), f is the focal length of the cameras and X is an object in the real 3D scene that is being captured. The real world object X is projected to different locations in images captured by the cameras C1 and C2, these locations being x1 and x2 respectively. The horizontal distance between x1 and x2 in absolute coordinates of the image is called disparity. The images that are captured by the camera setup are called stereoscopic images, and the disparity presented in these images creates or enhances the illusion of depth. For enabling the images to be shown separately to the left and right eye of the viewer, specific 3D glasses may be required to be used by the viewer. Adaptation of the disparity is a key feature for adjusting the stereoscopic video content to be comfortably viewable on various displays.

Figure 2:
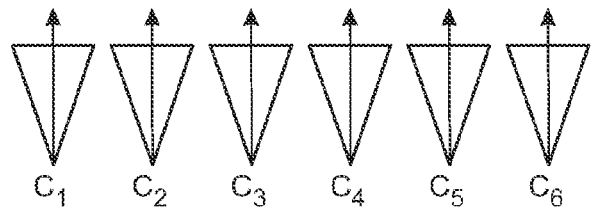
FIG. 2 shows a simplified model of a multiview camera setup.

However, disparity adaptation is not a straightforward process. It requires either having additional camera views with different baseline distance (i.e., b is variable) or rendering of virtual camera views which were not available in real world. FIG. 2 shows a simplified model of such multiview camera setup that suits to this solution. This setup is able to provide stereoscopic video content captured with several discrete values for stereoscopic baseline and thus allow stereoscopic display to select a pair of cameras that suits to the viewing conditions.

Figure 3:
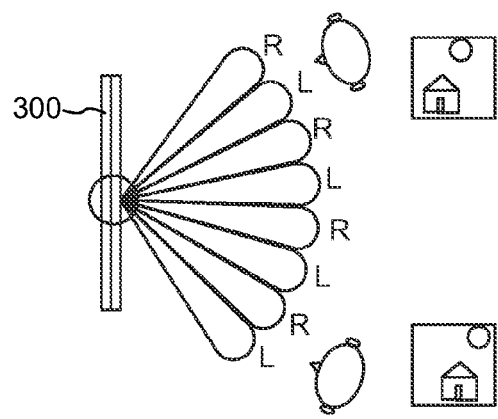
FIG. 3 shows a simplified model of a multiview autostereoscopic display (ASD)

A more advanced approach for 3D vision is having a multiview autostereoscopic display (ASD) 300 that does not require glasses. The ASD emits more than one view at a time but the emitting is localized in the space in such a way that a viewer sees only a stereo pair from a specific viewpoint, as illustrated in FIG. 3, wherein the house is seen in the middle of the view when looked at the right-most viewpoint. Moreover, the viewer is able see another stereo pair from a different viewpoint, e.g. in FIG. 3 the house is seen at the right border of the view when looked at the left-most viewpoint. Thus, motion parallax viewing is supported if consecutive views are stereo pairs and they are arranged properly. The ASD technologies may be capable of showing for example 52 or more different images at the same time, of which only a stereo pair is visible from a specific viewpoint. This supports multiuser 3D vision without glasses, for example in a living room environment.

The above-described stereoscopic and ASD applications require multiview video to be available at the display. The MVC extension of H.264/AVC video coding standard allows the multiview functionality at the decoder side. The base view of MVC bitstreams can be decoded by any H.264/AVC decoder, which facilitates introduction of stereoscopic and multiview content into existing services. MVC allows inter-view prediction, which can result into significant bitrate saving compared to independent coding of all views, depending on how correlated the adjacent views are. However, the bitrate of MVC coded video is typically proportional to the number of views. Considering that ASD may require 52 views, for example, as input, the total bitrate for such number of views will challenge the constraints of the available bandwidth.

Consequently, it has been found that a more feasible solution for such multiview application is to have a limited number of input views, e.g. a mono or a stereo view plus some supplementary data, and to render (i.e. synthesize) all required views locally at the decoder side. From several available technologies for view rendering, depth image-based rendering (DIBR) has shown to be a competitive alternative.

Figure 4:
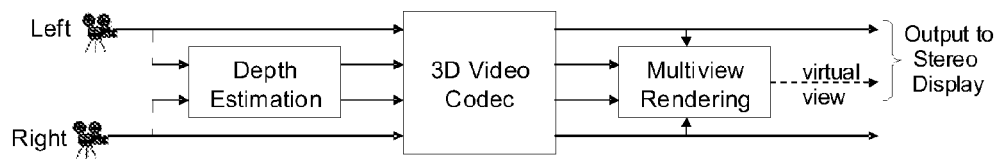
FIG. 4 shows a simplified model of a DIBR-based 3DV system.
Figure 6:
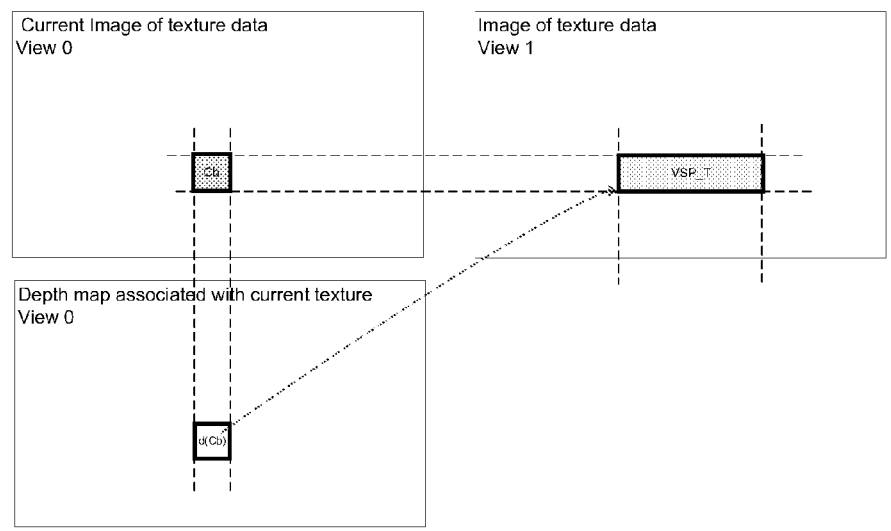
FIG. 6 illustrates a visualization of horizontal-vertical and disparity correspondence between texture and depth images in a first and a second coded view.

A simplified model of a DIBR-based 3DV system is shown in FIG. 4. The input of a 3D video codec comprises a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for each video frame. A depth map is an image with per-pixel depth information. Each sample in a depth map represents the distance of the respective texture sample from the plane on which the camera lies. In other words, if the z axis is along the shooting axis of the cameras (and hence orthogonal to the plane on which the cameras lie), a sample in a depth map represents the value on the z axis.

Depth information can be obtained by various means. For example, depth of the 3D scene may be computed from the disparity registered by capturing cameras. A depth estimation algorithm takes a stereoscopic view as an input and computes local disparities between the two offset images of the view. Each image is processed pixel by pixel in overlapping blocks, and for each block of pixels a horizontally localized search for a matching block in the offset image is performed. Once a pixel-wise disparity is computed, the corresponding depth value z is calculated by equation (3):

$$z = \frac{f \cdot b}{d + \Delta d}, \quad (3)$$

where f is the focal length of the camera and b is the baseline distance between cameras, as shown in FIG. 1. Further, d refers to the disparity observed between the two cameras, and the camera offset Δd reflects a possible horizontal misplacement of the optical centers of the two cameras.

Alternatively, or in addition to the above-described stereo view depth estimation, the depth value may be obtained using the time-of-flight (TOF) principle for example by using a camera which is provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light is typically used to make the illumination unobtrusive. The light reflected from objects in the scene is detected by an image sensor, which is modulated synchronously at the same frequency as the illuminator. The image sensor is provided with optics; a lens gathering the reflected light and an optical bandpass filter for passing only the light with the same wavelength as the illuminator, thus helping to suppress background light. The image sensor measures for each pixel the time the light has taken to travel from the illuminator to the object and back. The distance to the object is represented as a phase shift in the illumination modulation, which can be determined from the sampled data simultaneously for each pixel in the scene.

In the case of depth-enhanced multiview coding, the view synthesis can be utilized in an encoding loop of the encoder and in the decoding loop of the decoder, thus providing a view synthesis prediction (VSP). A view synthesis picture (a reference component) may be synthesized from coded texture views and depth views and may contain samples that may be used for the view synthesis prediction. To enable view synthesis prediction for the coding of the current view, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

Figure 8:
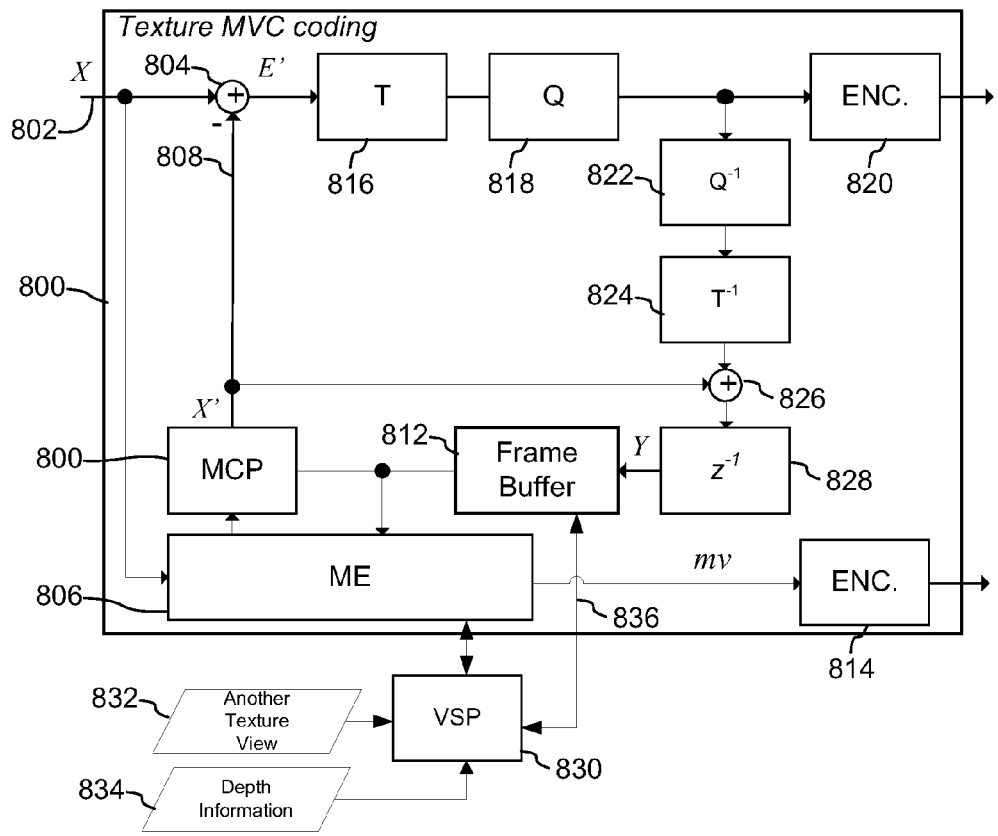
FIG. 8 shows an example of a view synthesis enabled multi-view video encoder as a simplified block diagram.

A view synthesis picture may also be referred to as synthetic reference component, which may be defined to contain samples that may be used for view synthesis prediction. A synthetic reference component may be used as reference picture for view synthesis prediction but is typically not output or displayed. A view synthesis picture is typically generated for the same camera location assuming the same camera parameters as for the picture being coded or decoded. An example of the encoding loop is depicted in FIG. 8.

An embodiment of the view synthesis algorithm of the view synthesis prediction may use depth map (d) to disparity (D) conversion with following mapping pixels of source picture s(x,y) in a new pixel location in synthesized target image t(x+D,y).

$$t(\lfloor x+D \rfloor, y) = s(x, y), \quad (4)$$

$$D(s(x, y)) = \frac{f \cdot l}{z}$$

-continued
$$z = \left( \frac{d(s(x, y))}{255} \left( \frac{1}{Z_{near}} - \frac{1}{Z_{far}} \right) + \frac{1}{Z_{far}} \right)^{-1}$$

In the case of projection of a texture picture, s(x,y) is a sample of a texture image, and d(s(x,y)) is the depth map value associated with s(x,y). If a reference frame used for synthesis uses 4:2:0 sampling (i.e. the chroma component pictures have a spatial resolution half of that of the luma component picture along both coordinate axes), the chroma components may be up-sampled to 4:4:4 by repeating the sample value:

$$s'_{chroma}(x,y) = s_{chroma}(\lfloor x/2 \rfloor, \lfloor y/2 \rfloor)$$

where $s'_{chroma}(\bullet,\bullet)$ is the chroma sample value in full resolution, and $s_{chroma}(\bullet,\bullet)$ is the chroma sample value in half resolution.

In the case of projection of depth map values, s(x,y)=d(x,y) and this sample is projected using its own value d(s(x,y))=d(x,y).

The view synthesis prediction may include warping in sub-pixel accuracy, for which up-sampling on the reference frame may be performed before warping and the synthesized frame may be down-sampled back to the original resolution.

The view synthesis process may consist of two conceptual steps: forward warping and hole filling. In forward warping, each pixel of the reference image is mapped to a synthesized image for example using the equation above. When multiple pixels from reference frame are mapped to the same sample location in the synthesized view, the pixel associated with a larger depth value (closer to the camera) may be selected to represent that sample location. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels in a hole may be filled by one of the two adjacent non-hole pixels which has a smaller depth sample value (farther from the camera).

Warping and hole filling may be performed in a single processing loop for example as follows. Each pixel row of the input reference image is traversed from e.g. left to right, and each pixel in the input reference image is processed as follows:

The current pixel is mapped to the target synthesis image according to the depth-to-disparity mapping/warping equation above. Pixels around depth boundaries may use splatting, in which one pixel is mapped to two neighboring locations. A boundary detection may be performed every N pixels in each line of the reference image. A pixel may be considered a depth-boundary pixel if the difference between the depth sample value of the pixel and that of a neighboring one in the same line (which is N-pixel to the right of the pixel) exceeds a threshold (corresponding to a disparity difference of M pixels in integer warping precision to the synthesized image). The depth-boundary pixel and K neighboring pixels to the right of the depth-boundary pixel may use splatting. More specifically, N=4×UpRefs, M=4, K=16× UpRefs-1, where UpRefs is the up-sampling ratio of the reference image before warping.

When the current pixel wins the z-buffering, i.e. when the current pixel is warped to a location without previously warped pixel or with a previously warped pixel having a smaller depth sample value, the iteration is defined to be effective and the following steps may be performed. Otherwise, the iteration is ineffective and the processing continues from the next pixel in the input reference image.

If there is a gap between the mapped locations of this iteration and the previous effective iteration, a hole may be identified.

If a hole was identified and the current mapped location is at the right of the previous one, the hole may be filled.

If a hole was identified and the current iteration mapped the pixel to the left of the mapped location of the previous effective iteration, consecutive pixels immediately to the left of this mapped location may be updated if they were holes.

To generate a view synthesized picture from a left reference view, the reference image may first be flipped and then the above process of warping and hole filling may be used to generate an intermediate synthesized picture. The intermediate synthesized picture may be flipped to obtain the synthesized picture. Alternatively, the process above may be altered to perform depth-to-disparity mapping, boundary-aware splatting, and other processes for view synthesis prediction basically with reverse assumptions on horizontal directions and order.

In another example embodiment the view synthesis prediction may include the following. Inputs of this example process for deriving a view synthesis picture are a decoded luma component of the texture view component srcPicY, two chroma components srcPicCb and srcPicCr up-sampled to the resolution of srcPicY, and a depth picture DisPic.

Output of an example process for deriving a view synthesis picture is a sample array of a synthetic reference component vspPic which is produced through disparity-based warping, which can be illustrated with the following pseudo code:

```
for( j = 0; j < PicHeigh ; j++ ) {
    for( i = 0; i < PicWidth; i++ ) {
        dX = Disparity(DisPic(j,i));
        outputPicY[ i+dX, j ] = srcTexturePicY[ i, j ];
        if( chroma_format_idc = = 1 ) {
            outputPicCb[ i+dX, j ] = normTexturePicCb[ i, j ]
            outputPicCr[ i+dX, j ] = normTexturePicCr[ i, j ]
        }
    }
}
``` where the function "Disparity( )" converts a depth map value at a spatial location i,j to a disparity value dX, PicHeigh is the height of the picture, PicWidth is the width of the picture, srcTexturePicY is the source texture picture, outputPicY is the Y component of the output picture, outputPicCb is the Cb component of the output picture, and outputPicCr is the Cr component of the output picture.

Disparity is computed taking into consideration camera settings, such as translation between two views b, camera's focal length f and parameters of depth map representation (Znear, Zfar) as shown below.

$$dX(i, j) = \frac{f \cdot b}{z(i, j)}; \quad (5)$$

$$z(i, j) = \frac{1}{\frac{DisPic(i, j)}{255} \cdot \left(\frac{1}{Z_{near}} - \frac{1}{Z_{far}}\right) + \frac{1}{Z_{far}}}$$

The vspPic picture resulting from the above described process may feature various warping artifacts, such as holes and/or occlusions and to suppress those artifacts, various post-processing operations, such as hole filling, may be applied.

However, these operations may be avoided to reduce computational complexity, since a view synthesis picture vspPic is utilized for a reference pictures for prediction and may not be outputted to a display.

The synthesized picture {outputPicY, outputPicCb, outputPicCr} may be introduced in the reference picture list in a similar way as is done with inter-view reference pictures. Signaling and operations with reference picture list in the case of view synthesis prediction may remain identical or similar to those specified in H.264/AVC or HEVC.

Similarly, processes of motion information derivation and their applications in view synthesis prediction may remain identical or similar to processes specified for inter and inter-view prediction of H.264/AVC or HEVC.

Introducing view synthesis prediction in 3D video encoding/decoding processes may not affect such low level operations as motion information signaling and decoding, any thus may enable preserving low-level compatibility with the existing H.264/AVC or HEVC coding standard.

Alternatively or in addition, specific coding modes for the view synthesis prediction may be specified and signaled by the encoder in the bitstream. For example, in a VSP skip/direct mode the motion vector difference (de)coding and the (de)coding of the residual prediction error for example using transform-based coding may also be omitted. For example, if a macro block is indicated within the bitstream to be coded using a skip/direct mode, it may further be indicated within the bitstream whether a VSP frame is used as reference.

The encoder according to some example embodiments of the present invention may include one or more of the following operations. It should be noted here that similar principles may also be applicable at a decoder side for decoding.

Coding/decoding of a block Cb in a texture/video in view #N is performed with usage of reference texture/video data of view #i (where i≠N), also referred to as Ti, that serves as a VSP source image and provides image samples for view synthesis process.

In the following, some characteristic aspects of some embodiments are summarized.

Availability of Depth/Disparity Information d(Cb)

The coding/decoding of a block Cb in a texture/video view #N, may be performed with depth information, depth map information, disparity information or any other ranging information d(Cb) which is associated with this texture information Cb and the range information is available prior to coding/decoding of texture block.

Reference Area R(Cb) for VSP

In some embodiments the view synthesis prediction for a texture block Cb results in producing or calculation pixel or reference sample values in a reference area R(Cb) in a reference VSP image of view #M, where M!=N. In some embodiments, samples of the reference area R(Cb) may be the prediction block for the texture block Cb, while in some other embodiments samples of the reference area R(Cb) may be used to derive samples of the prediction block for the texture block Cb for example through motion-compensated prediction and/or sub-pixel value interpolation within the reference area R(Cb) or through a joint processing of multiple reference areas R(Cb) obtained from different views.

Backward Projection

In some embodiments the process of the view synthesis prediction is performed with a backward projection approach and may utilize the following steps:

Ranging information dN(Cb) associated with coded block Cb in the view #N is converted to a disparity information Di(Cb) which specify spatial coordinates offset between samples of the current view #N and the reference view #i.

The conversion to the disparity information Di(Cb) may be performed in a pixel-wise approach, where for every sample of the disparity information Di(Cb) of the current view #N independent disparity information Di(Cb) is computed or estimated. Alternatively, conversion to disparity may be done block-wise so that a derived ranging information value dN(Cb') is obtained for example by averaging ranging information values dN(Cb), applying a median filter to the ranging information values dN(Cb), or applying any other function or filter over all the samples in the ranging information values dN(Cb). Then, the derived ranging information value dN(Cb') may be converted to the respective disparity value Di(Cb') using e.g. a depth-to-disparity mapping. Alternatively, conversion to disparity can be done block-wise so that disparity information Di(Cb) is processed for example by averaging values of disparity information Di(Cb), applying a median filter to the values of the disparity information Di(Cb), or applying any other function or filter over all the samples in the disparity information Di(Cb) to produce a respective disparity value Di(Cb").

Disparity information Di(Cb) or respectively Di(Cb') or Di(Cb") may be utilized to locate sample values in the texture of the reference view #i and associated with these texture samples ranging information di(Cb), e.g. samples of depth map image in the reference view #i. If the disparity information Di(Cb) is a block of disparity values, then sample values of the texture reference view #i may be located pixel-wise. If the disparity information Di(Cb) represents a single disparity value for a block of pixels, then sample values of the texture reference view #i may be located block-wise. The located samples may be utilized to form R(Cb). The locating and/or copying may also be referred to projecting, mapping, filtering or warping.

Producing of the reference area R(Cb) may include various processing of pixels of the reference view #i (i.e. Ti), e.g. spatial or temporal filtering, filtering using weighted prediction parameters to compensate luminance changes, or non-linear processing to handle occlusions or holes, or others. Such processing may be performed before or after projecting the pixels to the reference area R(Cb).

A consequence of the backward projection in the view synthesis prediction is that the derivation order of the reference area R(Cb) may be arbitrary. In other words, pixel values of the reference area R(Cb) in the VSP image may be produced independently for each block Cb, and no dependency on order of processed Cb(s) is assumed. Therefore, identical pixel values of the reference area R(Cb) may be produced by a view synthesis process for a single Cb, or by view synthesis process entire a frame-level. This property enables implementation of the backward view synthesis prediction as a frame-level or slice-level that may not require changes in the block-level coding/decoding compared to existing coding methods such as H.264/MVC. However, the property may also enable block-level implementation, which may consume a smaller amount of memory.

In the following, some supplementary characteristic aspects of some embodiments are summarized. One or more of these aspects may be additionally used with the aspects listed above.

Block-Based Multi-Hypothesis Prediction from More than One VSP Reference Frame

Bi-prediction or any other type of multi-hypothesis prediction may use two or more reference VSP frames as a reference. Bi-prediction may be weighted, for example to compensate illumination differences between views.

Sample-Based R(Cb) Derivation from Multiple VSP Source Images

If multiple VSP source images are available for R(Cb) sample value calculation, various processing may be applied to produce actual texture sample for R(Cb). This processing may include but is not limited to conditional selection (e.g. texture sample with closer depth value may be selected, or smaller depth value may be selected) or aggregating multiple candidates into samples.

Depth/Disparity-Based R(Cb) Derivation

Corresponding sample values of di(Cb) and dN(Cb) may be compared using different similarity or difference metrics, such as a Sum of Absolute Differences (SAD). A difference metric may be derived for a block di(Cb) or individual samples of di(Cb). If a difference belongs to a certain range, texture samples of the reference view #i that are specified by disparity Di(Cb) may be utilized for producing sample values of the reference area R(Cb).

In the following some embodiments are described in more detail.

FIG. 8 shows a flowchart of an example embodiment of a motion estimation/motion compensated prediction chain of texture coding with use of the view synthesis prediction according to some example embodiments. The view synthesis prediction does not necessarily produce a complete VSP frame, but may only produce a reference area R(Cb) on a request from the motion estimation/motion compensated prediction chain.

Figure 5:
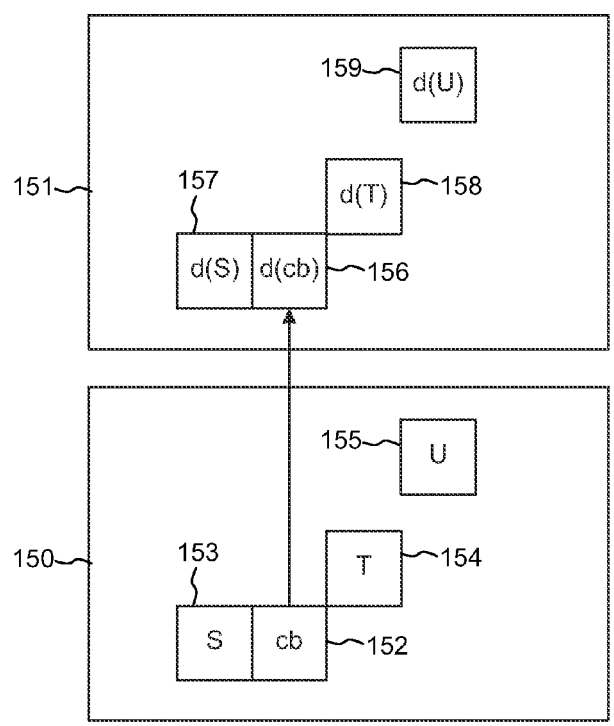
FIG. 5 illustrates an example of video plus depth data.

FIG. 5 illustrates an example of video plus depth data. In FIG. 5 the block 152 illustrates the currently coded block Cb of texture 150 and the block 156 is associated with this texture ranging information d(Cb), e.g. a depth map 151. The other blocks 153, 154, 155 of the texture 150 represent the neighboring block S on the left hand side of the current block cb, the neighboring block T at the top-right corner of the current block cb and a non-neighboring block U in the texture 150. The blocks 157, 158, 159 illustrate ranging information d(S), d(T), d(U) of the texture blocks S, T, U, respectively.

In the following it is assumed that coded multiview plus depth video coding (MVD) data contains texture and depth map components which represent multiple videos possibly captured with a parallel camera set up and these captured views being rectified.

Terms Ti and di represent texture and depth map components of view #i respectively. Texture and depth map components of MVD data may be coded in a different coding order, e.g. T0d0T1d1 or d0d1 T0T1. In some embodiments it is assumed that the depth map component di is available (decoded) prior to the texture component Ti and the depth map component di is utilized in the coding/decoding of the texture component Ti.

In the following a first embodiment, which is based on a pixel-based backward video synthesis prediction for the current block Cb, is illustrated in more detail. For example, the following assumptions may be utilized: the coding order is T0d0d1T1, the texture component T1 coded with the video synthesis prediction, and the currently coded block Cb1 has partition 16×16. The currently coded block Cb1 is associated with depth map data d(Cb1) and the depth map data consists of the block of the same size 16×16. In some embodiments the multiview video plus depth coding can then be implemented with the following steps.

Depth to Disparity Conversion

The block of depth map data d(Cb1) is converted to a block D(Cb1) of disparity samples. The process of conversion may be performed with following equations or with its integer arithmetic implementations:

$$Z(Cb1) = 1 / \left( \frac{d(Cb1)}{255} \left( \frac{1}{Z\_near} - \frac{1}{Z\_far} \right) + \frac{1}{Z\_far} \right) \quad (6)$$

$$d(Cb1) = \left( \frac{f \cdot b}{Z(Cb1)} \right),$$

where d0 is a depth map value of a view #0, Z is the actual depth value, and D is a disparity to a particular view.

The parameters f, b, Z_near and Z_far can be derived from the camera setup; i.e. the used focal length (f), the camera separation (b) between the view #0 and the view #i and the depth range (Z_near,Z_far) represent parameters of the depth map conversion. Resulting disparity value D is applied as a horizontal coordinates offset (dX) which is applied to convert spatial coordinates in the view #1 to a spatial coordinate in a view #i.

In general Equation (5) is assumed to implement floating point arithmetic. However due to finite nature of a sampling grid, disparity value may be rounded either to a nearest integer (in this case pixel-to-pixel correspondence is achieved), or to some sub-pixel accuracy (in this case, reference image Ti should be up-sampled to a required accuracy). In this principle, disparity value computed by using the equation (5) is no different from motion vector component mv_x represented with sub-pixel accuracy.

Projection of Texture Pixels to R(Cb)

Disparity D1(i,j) is calculated for every depth map value d1(i,j), and it is applied to find location of associated texture pixels in view #0. Being applied between currently coded view #1 to a view #i, disparity values provide a location of texture pixels Ti in the view #i, associated with the current object. Being fetched from pointed locations, pixels are utilized to produce pixels in the reference block R(Cb), which may have the size equal to the size of the current block Cb.

```
for( j = 0; j < 16 ; j++ ) {
    for( i = 0; i < 16; i++ ) {
        dX = Disparity(d(Cb1(I,j)));
        R(CB)[ j, i ] = Ti[ j, i+dX ];
    }
}
```

In some implementations, the reference block R(Cb) may be larger in size than the current block Cb for example to enable refinement of the displacement between Cb and R(Cb) through motion vector coding or similar. Such larger R(Cb) may be generated for example by splatting mapped pixels to a larger area than a single sample location in R(Cb) and/or using a depth/disparity block larger than Cb for derivation of R(Cb).

In the case of utilization of disparity information with sub-pixel accuracy, disparity value DX may be rescaled to reflect difference in resolution of the VSP source image and currently coded image and pixels of R(Cb) may be produced through an interpolation process, where N nearest samples of Ti may be utilized to produce a sample for example as follows.

```
for( j = 0; j < 16 ; j++ ) {
    for( i = 0; i < 16; i++ ) {
        DX = Disparity(d(Cb1(I,j)));
        R(CB)[ j, i ] =
            interpolate( Ti[ j, i+DX -N/2: i+DX +N/2-1], );
    }
}
``` where index term "A:B" specifies all indexes that belongs to the range between A and B. In this particular example, this means that the interpolate function takes into consideration all Ti pixels that locate in the range between i+DX−N/2 and i+DX+N/2−1.

Other examples of the interpolation may include but are not limited to in-loop interpolations utilized in H.264/AVC and HEVC.

In some embodiments, pixels of the video synthesis prediction source marked for R(Cb) production may undergo additional analysis of associated ranging information, or sample neighbors with the following processing:

```
for( j = 0; j < 16 ; j++ ) {
    for( i = 0; i < 16; i++ ) {
        DX = Disparity(d(Cb1(I,j)));
        R(CB)[ j, i ] = function( Ti[ j, i+DX -N/2:
i+DX +N/2-1], di[ j, i+DX -N/2: i+DX +N/2-1], dI[ j, i+DX -N/2:
i+DX +N/2-1]);
    }
}
```

Where di are ranging information of the view #i, dI depth map information for the view #1 and function is the processing function.

In some embodiments, a multitude of the video synthesis prediction source images can be available for production of R(Cb). A particular video synthesis prediction source utilized for R(Cb) may be signaled to the decoder within a bitstream or derived at the decoder through the derivation process.

The encoder may perform selection of the video synthesis prediction source image through a Rate-Distortion Optimization (RDO), or through optimization of some other cost metric. In such embodiments, the selected video synthesis prediction source image is utilized for video synthesis prediction based coding of current texture block and the identification of selected video synthesis prediction source image is signaled to the decoder side.

Non-limiting examples of signaling for the used video synthesis prediction source image may include signaling of a reference frame index associated with motion vector components at block partition level, signaling through a specified partitioning information (e.g. coding modes) at macro-block level or below, signaling at the slice-level (identified video synthesis prediction source image to be used in the video synthesis prediction for all video synthesis prediction coded texture blocks of the current slice) or signaling through a sequence parameter set or below (all video synthesis prediction coded texture of current sequences are coded with identified video synthesis prediction source image utilized in the video synthesis prediction).

In yet another embodiment, a set of video synthesis prediction source candidates can be pre-specified and/or communicated with decoder in advance. In such embodiments, the encoder signals an index to a specific candidate, or signals an index on how to derive an identification of the video synthesis prediction source image from information available at the decoder side, e.g. by extracting an index from already coded information.

The encoder and the decoder may perform derivation of the video synthesis prediction source image for R(Cb) or individual samples of R(Cb) through a specified derivation process which is identical at the encoder and the decoder side. Non-limiting examples of such derivation processes may include: depth dependent selection (e.g. the video synthesis prediction source with depth values closest to a d(Cb) is selected, or the video synthesis prediction source with a smaller depth value (representing an object of the 3D scene closest to the camera), or derivation of an optimal video synthesis prediction source from previously coded blocks, or neighboring blocks. The derivation process may be sample-wise or block-wise. If the derivation process is block-wise, the derivation may include filtering, such as averaging of d(Cb) and the respective candidate R(Cb) blocks.

In some embodiments the encoder and the decoder can utilize a predefined set of derivation processes. An index of the utilized process may be signaled to the decoder at the macro-block level or below, at the slice level or below, at the sequence parameter set or below or it may be specified by the utilized coding profile.

Predicting Cb from R(Cb)

The current block Cb may be predicted from R(Cb) in a conventional way for motion compensated prediction, the reference index pointing to a particular reference VSP image, and motion vector components mv_x and mv_y are referencing a particular spatial location in this reference frame.

The reference index and motion vector components may be coded in a conventional way and may be transmitted to the decoder.

In some embodiments, Cb can be predicted from R(Cb) with the use of fractional-pel motion vectors, therefore, the reference area R(Cb) has larger block size than the current block Cb.

In some embodiments, the video synthesis prediction for the current block Cb can be produced from R(Cb) with the use of zero motion vectors (Mv_x=mv_y=0). In such embodiments, the reference area R(Cb) may have the block size identical to the current block Cb.

In some embodiments, residual motion vector information may be considered as known a-priori or it may be derived at the decoder side and residual motion vectors are not transmitted to the decoder. The derivation of the motion vector at the decoder side may be based for example on minimizing depth/disparity difference using a particular similarity/difference metric, such as sum of absolute differences, within a certain search range or among candidate motion vectors, which may be selected for example from adjacent spatial blocks or certain temporal or inter-view blocks e.g. with certain spatial location with respect to the current block Cb.

In some embodiments, the reference index for a reference video synthesis prediction image is considered as known a-priori or it may be derived at the decoder side, i.e. the reference index for a reference video synthesis prediction image is not transmitted to the decoder.

In some embodiments, the use of the video synthesis prediction image for coding/decoding of the current block Cb may not be transmitted in the form of the reference index as a part of motion information signaling but by using alternative forms of signaling instead. Non-limiting examples of such signaling may include: the use of a specific flag specifying the use of video synthesis prediction for the current block Cb. Such flag may be signaled at the macro-block level or on block partitions-levels in a H.264/AVC-based codec, on coding unit (CU) level or below in a HEVC-based codec, or it may be signaled through an index of prediction candidates known a-priori at the decoder side, as in a HEVC codec. A flag may be CABAC-coded or coded with some other arithmetic codec or similar and hence is not necessarily represented by a bit in the bitstream.

In the following a second embodiment, which is based on processing of ranging information in the view synthesis prediction, is illustrated in more detail. The second embodiment differs from the first embodiment as shown below.

Prior to conversion to the disparity as it was shown in Equation (5), the depth component of the multiview plus depth video coding may undergo some processing, for example as illustrated below.

The depth map can undergo various filtering, which may include linear and/or non-linear filtering, mean or median filtering.

In the case of mean filtering, an average of disparity values d(Cb) is computed and utilized in Equation (5) to produce a single average disparity value D(Cb) for the entire block Cb:

$$Av\_d=\text{mean}(d(Cb)).$$

Alternatively, median filtering can be utilized instead of the mean filtering.

$$\text{median}\_d=\text{median}(d(Cb)).$$

Alternatively, minimal or maximal values of the depth map data can be utilized in Equation (5):

$$\min\_d=\min(d(Cb)).$$

$$\max\_d=\max(d(Cb)).$$

In some embodiments, pixel-wise disparity may be produced from disparity values d(Cb), as it is specified in Equation (5), and following this step a single disparity value representing the current block Cb may be produced through operations in the disparity domain. The single disparity value may be produced through linear or non-linear processing, non-limiting examples of which include mean, median or min/max operations.

In some embodiments, the sub-sampling operation of the disparity values d(Cb) applied to the disparity values d(Cb) can be utilized to provide a depth map representation for the current block Cb in Equation (5).

In yet another embodiment, depth map representation for the current block Cb can be derived from previously coded depth map components (views) or from previously coded texture blocks.

In yet another embodiment, depth map candidates for the representation of the current block Cb can be available at the encoder and decoder prior to coding/decoding of the current block Cb. An index to a specific depth value utilized for coding/decoding of the current block Cb can be signaled in the bitstream or can be derived at the encoder and decoder sides.

The other stages of the first embodiment may then be performed in the same way as shown above in connection with the first embodiment.

In the following, a third embodiment, which is based on multi-directional view synthesis prediction with RDO, is illustrated in more detail.

In the case of multiview 3D video coding, a VSP frame may be generated from view synthesis from multiple reference views. For example, assuming 3-view coding, multiview plus depth video components may be coded with T0-d0-d1-d2-T1-T2 order. With this order, texture view T1 can utilize view synthesis prediction and corresponding VSP frame may be projected from the view #0. Texture view T2, in contrast, may utilize the VSP frame which is produced from the view #0 and the view #1. Therefore, it may utilize either multiple VSP frames for coding/decoding, or competing VSP frames may be fused to improve the quality of the view synthesis prediction.

Producing and handling multiple reference VSP frames at the decoder side may be demanding for a decoder in terms of computational complexity and memory allocation. However, since the scheme proposed in some embodiments is performed at the block level, only the reference area R(Cb) is produced, not necessarily complete frames.

Decoding operations for the third embodiment regarding the depth to disparity conversion are different from the first and second embodiments. A decoder reads from the bitstream or extracts from the information available at the decoder an indicator which specifies the view (view_id) from which the view synthesis prediction should be performed. Different view_id (VSP direction) would have different input to the depth to disparity conversion, such as translation param b or focal length and may result in different disparity values. Following this, the decoder may perform the other steps of the first embodiment or the second embodiment with no changes.

The encoder in contrast, would perform the first and the second embodiment completely for all available views, which may result in multiple copies of coded Cb. The view_id which provides minimal cost in some rate-distortion optimization might be selected for coding and may be signaled to the decoder side.

Alternatively, the encoder may extract information on view synthesis prediction direction from available information and perform coding of the current block Cb without signaling. In such embodiments, the decoder would perform extraction of the view_id at the decoder side in a corresponding procedure. For example, the encoder and the decoder may select the VSP source frame that is physically closest to the present view in terms of camera translation. If there are two (or more) views equally close to the current view in terms of camera translation, the encoder and the decoder may choose between the views based on a deterministic rule, such as choosing the view with a smaller view order index.

In the following a fourth embodiment, which is based on a multi-directional view synthesis prediction with depth-aware selection, is illustrated in more detail.

Alternatively or in addition to the third embodiment, the view synthesis prediction direction may be selected at the encoder and decoder side based on the depth information available at the encoder/decoder sides prior to coding/decoding the current block Cb.

Since depth information d(Cb) within the view #2, corresponding the view synthesis prediction D0 from the view #0, and the view synthesis prediction D1 from the view #1 are all available at the encoder and the decoder sides prior to coding of the current block Cb, it can be utilized for decision making on preferable view synthesis prediction direction for the current block Cb. For example, the direction which provides minimal Euclidian distance between d(Cb) and VSP_D might be selected for the prediction.

$$Cost1=\min(\text{average}(d(Cb))-\text{average}(VSP\_D1)$$

$$Cost2=\min(\text{average}(d(Cb))-\text{average}(VSP\_D2)$$

If (Cost1<Cost2) Vsp_id=1 Else Vsp_id=2,

It should be noted that different distortion metric may be utilized in the fourth embodiment.

In the following a fifth embodiment, which is based on a bi-directional VSP, is illustrated in more detail.

Alternatively or in addition to the third and fourth embodiment, the current block Cb in the view #2 can be predicted with a bi-directional view synthesis prediction. In such embodiments, the reference areas R0(Cb) and R1(Cb) would be created from the reference views #0 and #1 and utilized for the prediction of the current block Cb in the view #2 in a form of a weighted prediction.

In the following a sixth embodiment, which is based on weighting of uni-, multi- or bi-directional view synthesis prediction of the previous embodiment(s), is illustrated in more detail.

In some embodiments no complete VSP frame is available neither on decoder side or encoder side, therefore estimation of weights for weighted prediction from a complete frame in a conventional way would be costly in terms of required computations, memory use, and memory access bandwidth. Furthermore, utilizing picture order count (POC)-based computation of weighted parameters would not be optimal as well, as the picture order count would have no reflection on quality of image resulting from the view synthesis prediction.

However, since the view synthesis prediction assumes projection of actual pixel values from a particular view (view synthesis prediction direction), weighting parameters for those pixels may be inherited from corresponding views, e.g. re-use wp1 parameters which is utilized for inter-view prediction view #2 from view #0, and wp2 parameters which is utilized for inter-view prediction view #2 from view #1.

In the first to fourth embodiment, the pixel data R(Cb) projected from a particular view may be re-scaled (normalized) with a corresponding weighting parameter. In the fifth embodiment, the pixel data R(Cb) would be computed as a weighted average of pixel data projected from the view #0 and the view #1.

Alternatively, or in addition, weighted prediction parameters can be estimated based on the depth information available at encoder or decoder side.

$$Wp1=\text{function}(d(Cb),VSP\_D1)$$

$$Wp2=\text{function}(d(Cb),VSP\_D2)$$

Alternatively, a function may be defined to return both Wp1 and Wp2, i.e. [Wp1, Wp2]=function(d(Cb), VSP_D1, VSP_D2). For example, the function may be specified as follows:

$$Cost1=\text{sad}(d(Cb),VSP\_D1)$$

$$Cost2=\text{sad}(d(Cb),VSP\_D2)$$

where sad(d(Cb), VDP_Dx) returns the sum of absolute differences between each pair of samples in d(Cb) and the corresponding sample in VSP_Dx. Then, Total_Cost is specified to be Cost1+Cost2. Finally Wp1 is specified to be Cost2/Total_Cost and Wp2 is specified to be Cost1/Total_Cost (with the assumption that the weights for weighted prediction sum up to 1).

Figure 13:
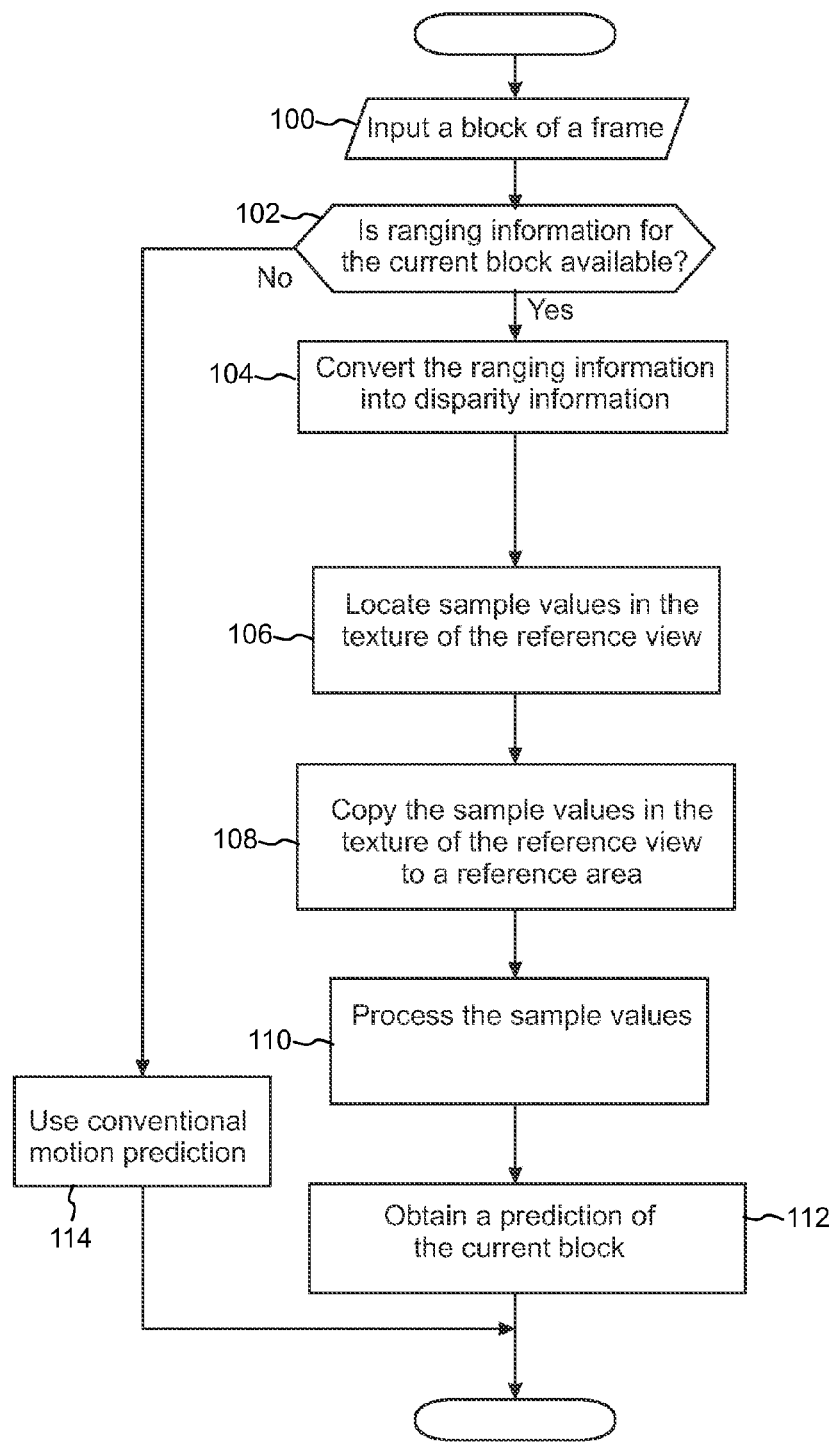
FIG. 13 shows an encoding method according to an example embodiment as a flow diagram.

An example of the encoder 800 is depicted in FIG. 8 as a simplified block diagram and the operation of the encoder according to an example embodiment is depicted as a flow diagram in FIG. 13. The encoder 800 receives 802 a block of a current frame of a texture view for encoding. The block can also be called as the current block Cb. The current block is provided to a first combiner 804, such as a subtracting element, and to the motion estimator 806. The motion estimator 806 has access to a frame buffer 812 storing previously encoded frame(s) or the motion estimator 806 may be provided by other means one or more blocks of one or more previously encoded frames. The motion estimator 806 examines which of the one or more previously coded blocks might provide a good basis for using the block as a prediction reference for the current block. If an appropriate prediction reference has been found, the motion estimator 806 calculates a motion vector which indicates where the selected block is located in the reference frame with respect to the location of the current block in the current frame. The motion vector information may be encoded by a first entropy encoder 814. Information of the prediction reference is also provided to the motion predictor 810 which calculates the predicted block.

The first combiner 804 determines the difference between the current block and the predicted block 808. The difference may be determined e.g. by calculating difference between pixel values of the current block and corresponding pixel values of the predicted block. This difference can be called as a prediction error. The prediction error is transformed by a transform element 816 to a transform domain. The transform may be e.g. a discrete cosine transform (DCT). The transformed values are quantized by a quantizer 818. The quantized values can be encoded by the second entropy encoder 820. The quantized values can also be provided to an inverse quantizer 822 which reconstructs the transformed values. The reconstructed transformed values are then inverse transformed by an inverse transform element 824 to obtain reconstructed prediction error values. The reconstructed prediction error values are combined by a second combiner 826 with the predicted block to obtain reconstructed block values of the current block. The reconstructed block values are ordered in a correct order by an ordering element 828 and stored into the frame buffer 812.

In some embodiments the encoder 800 also comprises a view synthesis predictor 830 which may use texture view frames of one or more other views 832 and depth information 834 (e.g. the depth map) to synthesize other views 836 on the basis of e.g. a depth map of the co-locating block in another view than the current block as illustrated above with several embodiments. The other texture view frames 832 and/or the synthesized views 836 may also be stored to the frame buffer 812 so that the motion estimator 806 may use the other views and/or synthesized views in selecting a prediction reference for the current block.

Motion vector components utilized for view synthesis based prediction, inter-view prediction, and inter-layer prediction may be restricted in their applicability range, which define a set of syntax elements and a set of decoding operations. For example, the value range and/or the precision of motion vector components or motion vector component differences relative to prediction values may be restricted. Furthermore, in some embodiments differential motion vector components utilized for view synthesis based prediction, inter-view prediction, and/or inter-layer prediction may have different initial context compared to differential motion vector components utilized for inter or temporal motion-compensated prediction. Furthermore, in some embodiments differential motion vector components utilized for view synthesis based prediction, inter-view prediction, and/or inter-layer prediction may be binarized differently for context-based arithmetic coding and decoding compared to the binarization of differential motion vector components of inter or temporal motion-compensated prediction.

When the encoder encodes texture information of a block of a frame or a picture, the encoder may determine 102 whether ranging information for the current block is available. This determination may include examining whether a co-located depth/disparity block for the same view than the view of the current block exists in the memory or is otherwise available for view synthesis prediction. The block to be encoded has been input to the encoder which is illustrated with block 100 in FIG. 13. If the determination indicates that the co-located depth/disparity block for the same view than the view of the current block is available for view synthesis prediction, the view synthesis prediction for the texture block of the current block is performed to obtain the reference area R(Cb). If the determination indicates that the co-located depth/disparity block for the same view than the view of the current block is not available for view synthesis prediction, a conventional motion prediction may be applied 114. In the embodiment depicted in FIG. 13 the view synthesis prediction comprises converting 104 the ranging information into disparity information which specify spatial coordinates offset between samples of the current view #N and the reference view #i. The disparity information is used to locate 106 sample values in the texture of the reference view #i. The located sample values in the texture of the reference view #i may be copied 108 to the reference area R(Cb). The view synthesis prediction for the texture block of the current block may also comprise processing 110 of samples of the reference view #i. The processing 110 may be performed before or after the copying 108. If the processing 110 is performed before the copying the processed values or part of them are copied to samples of the reference area R(Cb).

When the reference area R(Cb) has been constructed the current block Cb can be predicted 112 on the basis of information the reference area R(Cb).

Figure 9:
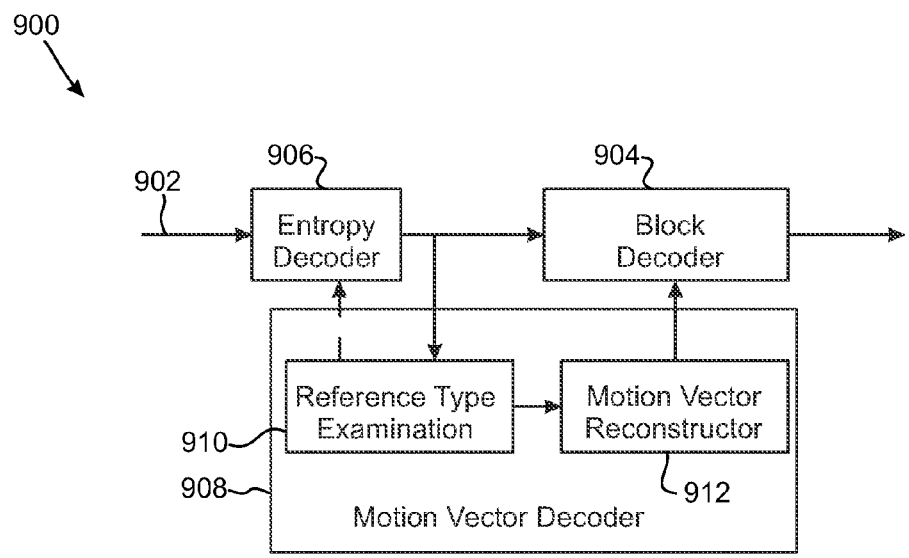
FIG. 9 shows an example of a view synthesis enabled multi-view video decoder as a simplified block diagram.
Figure 14:
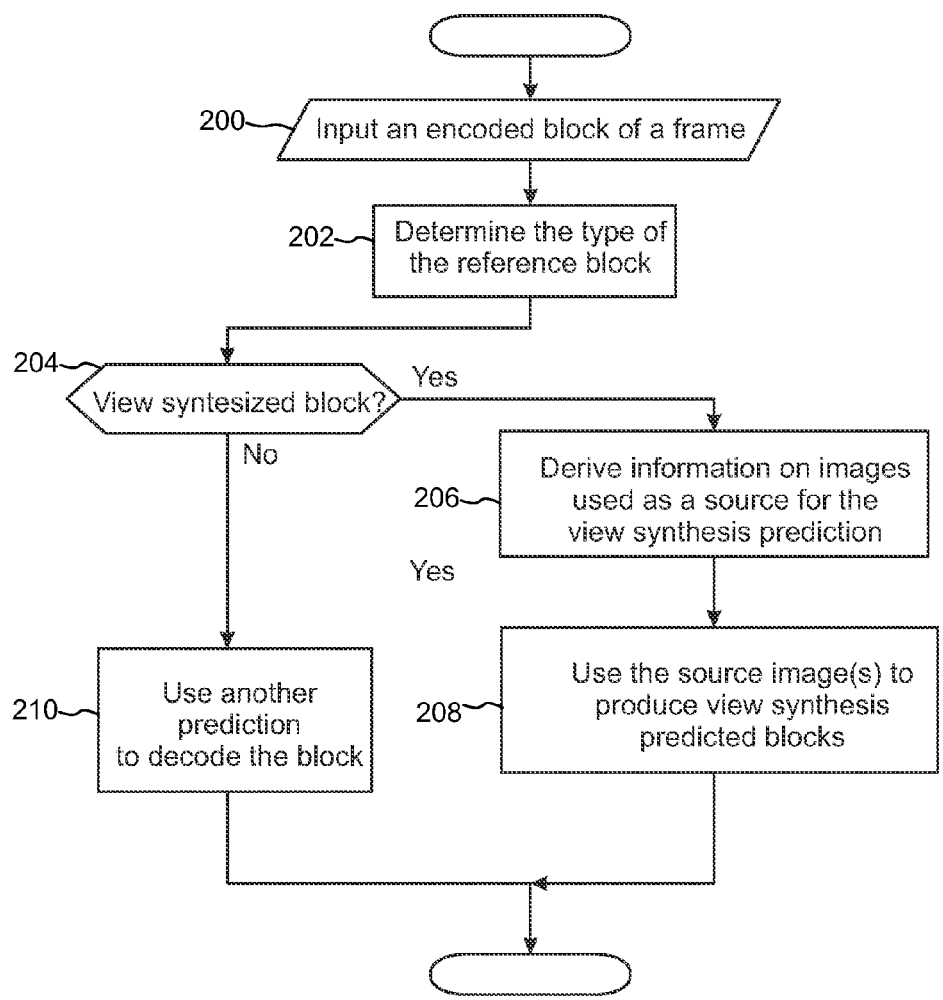
FIG. 14 shows a decoding method according to an example embodiment as a flow diagram.

In the following, the operation of an example embodiment of a decoder 900 will be described with reference to FIG. 9 and the flow diagram of FIG. 14. The decoder 900 receives 200, 902 a bitstream or a part of a bitstream which contains encoded video information. The encoded video information may contain prediction error values, motion vectors, reference indices, etc. It should be noted here that all this information need not be included in the same bitstream but some of the information may be transmitted in different bitstreams using different kinds of syntax elements.

In the following the decoding relating to the motion vector processing is mainly described and describing other decoding operations 904 such as reconstruction of blocks is mostly omitted from this specification.

The decoder 900 may comprise an entropy decoder 906 which decodes received, entropy encoded information. The decoded information may be provided to a motion vector decoder 908. The motion vector decoder 908 may comprise a reference type examining element 910 which may examine the decoded information to determine whether a reference index or another kind of reference indication of the type of the reference for the current block has been included in the received bitstream. If the reference indication has been received, the reference type examining element 910 may determine 202 the reference type on the basis of the reference indication. If the reference indication has not been received, the reference type examining element 910 may use other data to determine the reference type.

The motion vector decoder 908 may further comprise a motion vector reconstructing element 912 which may reconstruct the motion vector components for the current block.

If the reference indication indicates that the current block has been predicted using a conventional intra prediction, the current block may be reconstructed 220 by using received prediction error information and information of previously decoded blocks within the same frame than the current frame. If the indication indicates that the current block has been predicted using a conventional inter prediction, motion vector information and prediction error information are decoded and used together with the prediction reference i.e. the block of other, previously decoded frame which the encoder 800 has used when constructing 220 the prediction reference for the current frame.

If the reference indication indicates that the current block has been predicted using view synthesis prediction 204, the following operations may be performed by the decoder 900 in some embodiments. The decoder 900 may derive 206 or may receive from the encoder 800 information of image(s) used as a source for the view synthesis prediction and use 208 the source images to produce the VSP blocks using procedures corresponding to the encoder side.

If the reference indication indicates that the current block has not been predicted using view synthesis prediction 204, other prediction methods may be used 210 to decode the current block.

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptors may be used to specify the parsing process of each syntax element.

ae(v): context-adaptive arithmetic (CAB AC) entropy-coded syntax element b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with most significant bit written first.

ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

While embodiments of the invention have been described using particular coding standards and their extensions as basis, the invention can be applied for other codecs, bitstream formats, and coding structures too.

There is provided the following elements which can be combined into a single solution, as will be described below, or they can be utilized separately. As explained earlier, both a video encoder and a video decoder typically apply a prediction mechanism, hence the following elements may apply similarly to both a video encoder and a video decoder.

In various embodiments presented above neighboring blocks to the current block being coded/decoded cb are selected. Examples of selecting neighboring blocks include spatial neighbors (e.g. as indicated in FIG. 7*a*). Other examples include temporal in previous and/or later frames of the same view (e.g. as indicated in FIG. 7*b*), spatial neighbors in adjacent views, spatial neighbors in different layers, and spatial neighbors in synthesized views. The aspects of the invention are not limited to the mentioned methods of selecting neighboring blocks, but rather the description is given for one possible basis on top of which other embodiments of the invention may be partly or fully realized.

While many of the embodiments are described for prediction for luma, it is to be understood that in many coding arrangements chroma prediction information may be derived from luma prediction information using pre-determined relations. For example, it may be assumed that the same reference samples are used for the chroma components as for luma.

Figure 10:
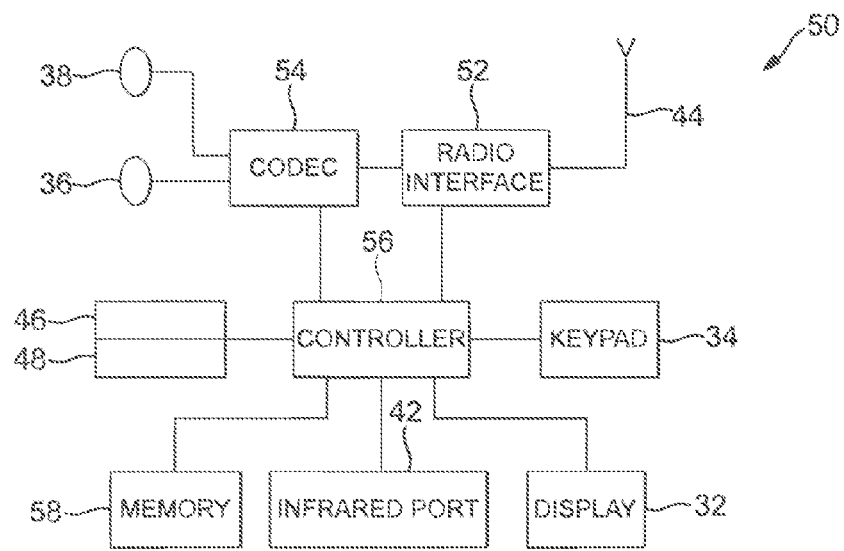
FIG. 10 shows schematically an electronic device suitable for employing some embodiments of the invention.
Figure 11:
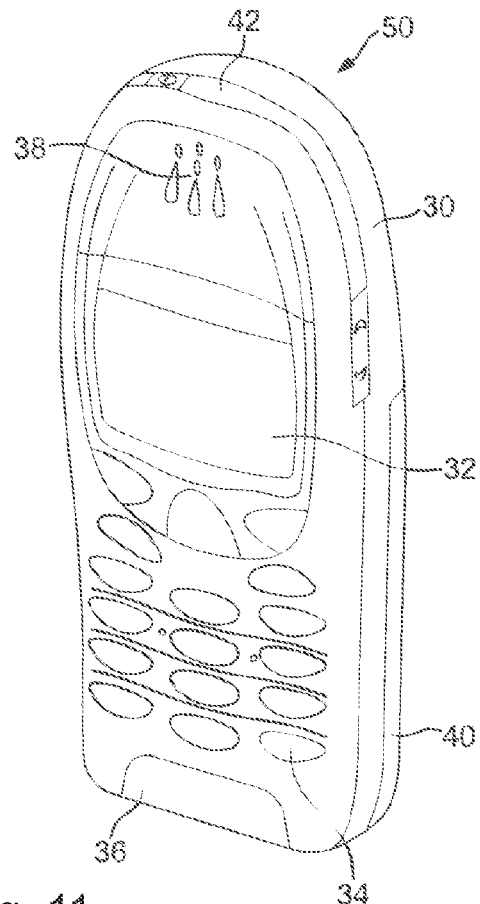
FIG. 11 shows schematically a user equipment suitable for employing some embodiments of the invention.

The following describes in further detail suitable apparatus and possible mechanisms for implementing the embodiments of the invention. In this regard reference is first made to FIG. 10 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 12:
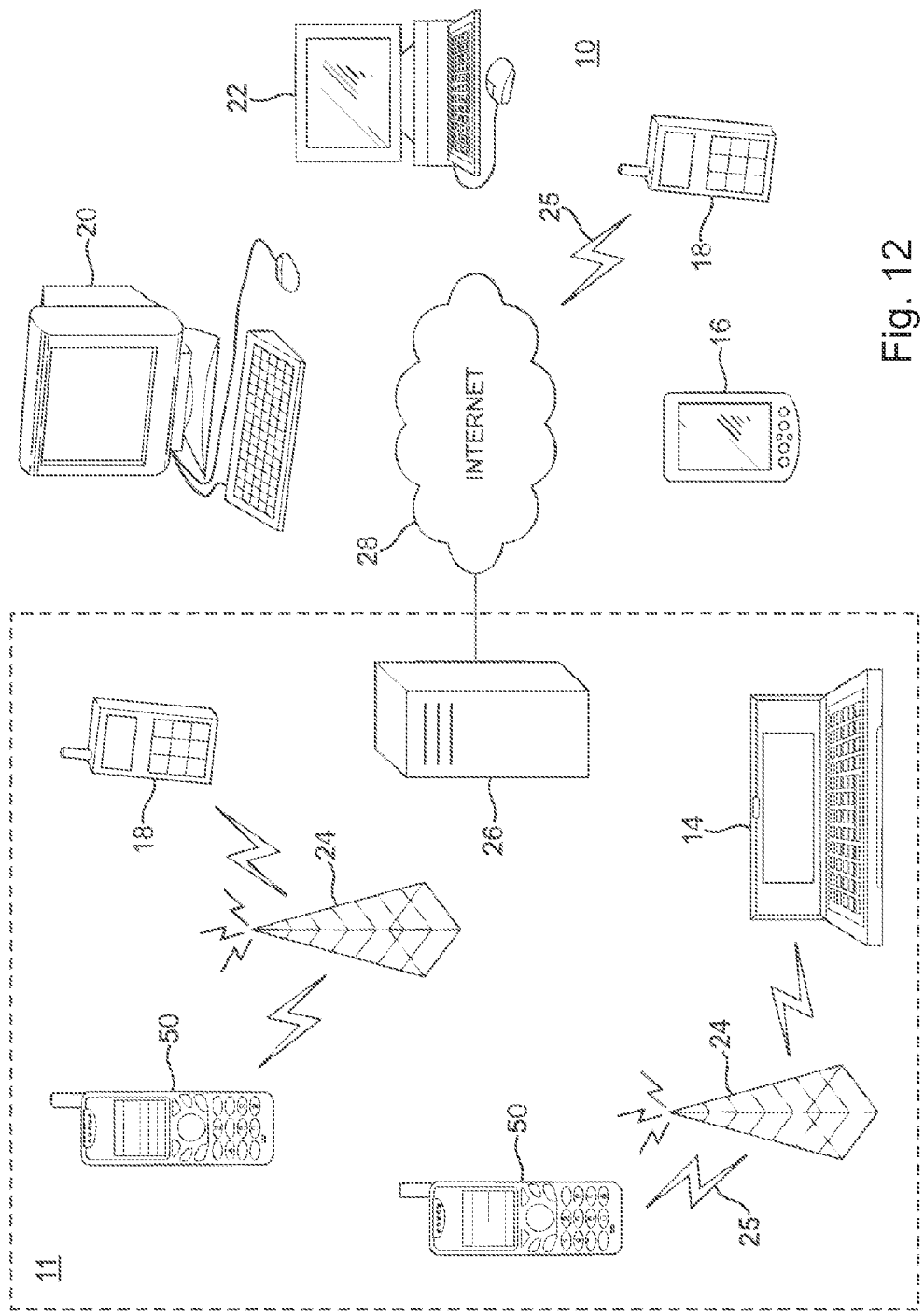
FIG. 12 further shows schematically electronic devices employing embodiments of the invention connected using wireless and wired network connections.

With respect to FIG. 12, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 12 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following, some examples will be provided.

According to a first example, there is provided a method comprising:

obtaining a first uncompressed texture block of a first texture picture representing a first view;

obtaining ranging information associated with the first texture block;

deriving disparity information with reference to a reference frame in a second view on the basis of the ranging information;

obtaining reference samples of the second view on the basis of the disparity information;

performing a view synthesis prediction by using the reference samples to obtain a reference block for encoding the first uncompressed texture block.

In some embodiments the method comprises providing two or more reference views for the obtaining the reference block.

In some embodiments the method comprises deriving disparity information to specify spatial coordinates offset between samples of the texture of the current block in the first view and reference samples in the second view.

In some embodiments the method comprises:

using the disparity information for locating reference samples in a texture of the second view; and obtaining predicted sample values on the basis of the located sample values.

In some embodiments the obtaining sample values of the reference area comprises one or more of the following:

filtering the sample values of the texture of the reference view;

filtering the sample values of the texture of the reference view using one or more weighted prediction parameters.

In some embodiments the method comprises using sample values of more than one reference frame in the filtering.

In some embodiments the method comprises using sample values of more than one reference view in the filtering.

In some embodiments the method comprises using a reference VSP frame as the reference frame.

In some embodiments the method comprises producing the reference VSP frame from two or more source frames.

In some embodiments the method comprises producing the reference VSP frame from two or more source views.

In some embodiments the method comprises producing the reference VSP frame by using two or more view synthesis methods.

In some embodiments the method comprises producing two or more reference VSP frames from two or more source frames or by using two or more view synthesis methods; and selecting one of the two or more reference VSP frames to be used as the reference VSP frame.

In some embodiments the method comprises providing at least one of the following:

an indication of one or more reference frame;

an indication of one or more view synthesis prediction methods utilized for producing the reference block;

an indication of one or more VSP source frames utilized for producing the reference block.

In some embodiments the method comprises providing at least one of the following:

signaling indication to the decoder though a coded bitstream; and deriving refining for indication at the decoder side from previously decoded texture and/or ranging information through a predefined decision making process.

In some embodiments the method comprises applying said indication for encoding or decoding a pixel, a block, a slice or a complete texture of a video sequence.

In some embodiments the method comprises providing at least a first reference picture list indicative of pictures used as reference pictures from which the reference block may be selected.

In some embodiments the method is used in a mobile communication device to encode video information.

In some embodiments the video information is multiview video information.

According to a second example there is provided an apparatus comprising at least one processor and at least one memory including computer program code, the at least one memory and the computer program code configured to, with the at least one processor, cause the apparatus to:

obtain a first uncompressed texture block of a first texture picture representing a first view;

obtain ranging information associated with the first uncompressed texture block;

derive disparity information with reference to a reference frame in a second view on the basis of the ranging information;

obtain reference samples of the second view on the basis of the disparity information;

perform a view synthesis prediction by using the reference samples to obtain a reference block for encoding the first uncompressed texture block.

In some embodiments of the apparatus said at least one memory stored with code thereon, which when executed by said at least one processor, further causes the apparatus to provide two or more views for the obtaining the reference block.

In some embodiments of the apparatus said at least one memory stored with code thereon, which when executed by said at least one processor, further causes the apparatus to derive disparity information to specify spatial coordinates offset between samples of the texture of the current block in the first view and reference samples in the second view.

In some embodiments of the apparatus said at least one memory stored with code thereon, which when executed by said at least one processor, further causes the apparatus to:

use the disparity information for locating reference samples in a texture of the second view; and obtain predicted sample values on the basis of the located sample values.

In some embodiments of the apparatus the obtaining sample values of the reference area comprises one or more of the following:

filtering the sample values of the texture of the reference view;

filtering the sample values of the texture of the reference view using one or more weighted prediction parameters.

In some embodiments of the apparatus said at least one memory stored with code thereon, which when executed by said at least one processor, further causes the apparatus to use sample values of more than one reference frame in the filtering.

In some embodiments of the apparatus said at least one memory stored with code thereon, which when executed by said at least one processor, further causes the apparatus to use sample values of more than one reference view in the filtering.

In some embodiments of the apparatus said at least one memory stored with code thereon, which when executed by said at least one processor, further causes the apparatus to use a reference VSP frame as the reference frame.

In some embodiments of the apparatus said at least one memory stored with code thereon, which when executed by said at least one processor, further causes the apparatus to produce the reference VSP frame from two or more source frames.

In some embodiments of the apparatus said at least one memory stored with code thereon, which when executed by said at least one processor, further causes the apparatus to produce the reference VSP frame from two or more source views.

In some embodiments of the apparatus said at least one memory stored with code thereon, which when executed by said at least one processor, further causes the apparatus to produce the reference VSP frame by using two or more view synthesis methods.

In some embodiments of the apparatus said at least one memory stored with code thereon, which when executed by said at least one processor, further causes the apparatus to:

produce two or more reference VSP frames from two or more source frames or by using two or more view synthesis methods; and select one of the two or more reference VSP frames to be used as the reference VSP frame.

In some embodiments of the apparatus said at least one memory stored with code thereon, which when executed by said at least one processor, further causes the apparatus to provide at least one of the following:

an indication of one or more reference frames;

an indication of one or more view synthesis prediction methods utilized for producing the reference block;

an indication of one or more VSP source frames utilized for producing the reference block.

In some embodiments of the apparatus said at least one memory stored with code thereon, which when executed by said at least one processor, further causes the apparatus to provide at least one of the following:

signal indication to the decoder though a coded bitstream; and derive refining for indication at the decoder side from previously decoded texture and/or ranging information through a predefined decision making process.

In some embodiments of the apparatus said at least one memory stored with code thereon, which when executed by said at least one processor, further causes the apparatus to apply said indication for encoding or decoding a pixel, a block, a slice or a complete texture of a video sequence.

In some embodiments of the apparatus said at least one memory stored with code thereon, which when executed by said at least one processor, further causes the apparatus to provide at least a first reference picture list indicative of pictures used as reference pictures from which the reference block may be selected.

In some embodiments of the apparatus said at least one memory stored with code thereon, which when executed by said at least one processor, further causes the apparatus to use the method in a mobile communication device to encode video information.

In some embodiments of the apparatus the video information is multiview video information.

According to a third example there is provided a computer program product including one or more sequences of one or more instructions which, when executed by one or more processors, cause an apparatus to at least perform the following:

obtain a first uncompressed texture block of a first uncompressed texture picture representing a first view;

obtain ranging information associated with the first uncompressed texture block;

derive disparity information with reference to a reference frame in a second view on the basis of the ranging information;

obtain reference samples of the second view on the basis of the disparity information;

perform a view synthesis prediction by using the reference samples to obtain a reference block for encoding the first uncompressed texture block.

In some embodiments the computer program product includes one or more sequences of one or more instructions which, when executed by one or more processors, cause the apparatus to provide two or more reference views for obtaining the reference block.

In some embodiments the computer program product includes one or more sequences of one or more instructions which, when executed by one or more processors, cause the apparatus to derive disparity information to specify spatial coordinates offset between samples of the texture of the current block in the first view and reference samples in the second view.

In some embodiments the computer program product includes g one or more sequences of one or more instructions which, when executed by one or more processors, cause the apparatus to:

use the disparity information for locating reference samples in a texture of the second view; and obtain predicted sample values on the basis of the located sample values.

In some embodiments of the computer program product the obtaining sample values of the reference area comprises one or more of the following:

filtering the sample values of the texture of the reference view;

filtering the sample values of the texture of the reference view using one or more weighted prediction parameters.

In some embodiments the computer program product includes one or more sequences of one or more instructions which, when executed by one or more processors, cause the apparatus to use sample values of more than one reference frame in the filtering.

In some embodiments the computer program product includes one or more sequences of one or more instructions which, when executed by one or more processors, cause the apparatus to use sample values of more than one reference view in the filtering.

In some embodiments the computer program product includes one or more sequences of one or more instructions which, when executed by one or more processors, cause the apparatus to use a reference VSP frame as the reference frame.

In some embodiments the computer program product includes one or more sequences of one or more instructions which, when executed by one or more processors, cause the apparatus to produce the reference VSP frame from two or more source frames.

In some embodiments the computer program product includes one or more sequences of one or more instructions which, when executed by one or more processors, cause the apparatus to produce the reference VSP frame from two or more source views.

In some embodiments the computer program product includes one or more sequences of one or more instructions which, when executed by one or more processors, cause the apparatus to produce the reference VSP frame by using two or more view synthesis methods.

In some embodiments the computer program product includes one or more sequences of one or more instructions which, when executed by one or more processors, cause the apparatus to:

produce two or more reference VSP frames from two or more source frames or by using two or more view synthesis methods; and select one of the two or more reference VSP frames to be used as the reference VSP frame.

In some embodiments the computer program product includes one or more sequences of one or more instructions which, when executed by one or more processors, cause the apparatus to provide at least one of the following:

an indication of one or more reference frames;

an indication of one or more view synthesis prediction methods utilized for producing the reference block;

an indication of one or more VSP source frames utilized for producing the reference block.

In some embodiments the computer program product includes one or more sequences of one or more instructions which, when executed by one or more processors, cause the apparatus to provide at least one of the following:

signal indication to the decoder though a coded bitstream; and derive refining for indication at the decoder side from previously decoded texture and/or ranging information through a predefined decision making process.

In some embodiments the computer program product includes one or more sequences of one or more instructions which, when executed by one or more processors, cause the apparatus to apply said indication for encoding or decoding a pixel, a block, a slice or a complete texture of a video sequence.

In some embodiments the computer program product includes one or more sequences of one or more instructions which, when executed by one or more processors, cause the apparatus to provide at least a first reference picture list indicative of pictures used as reference pictures from which the reference block may be selected.

In some embodiments the computer program product includes one or more sequences of one or more instructions which, when executed by one or more processors, cause the apparatus to use the method in a mobile communication device to encode video information.

In some embodiments of the computer program product includes the video information is multiview video information.

According to a fourth example there is provided an apparatus comprising:

means for obtaining a first uncompressed texture block of a first uncompressed texture picture representing a first view;

means for obtaining ranging information associated with the first uncompressed texture block;

means for deriving disparity information with reference to a reference frame in a second view on the basis of the ranging information;

means for obtaining reference samples of the second view on the basis of the disparity information;

means for performing a view synthesis prediction by using the reference samples to obtain a reference block for encoding the first uncompressed texture block.

According to a fifth example there is provided a method comprising:

receiving a bit stream comprising encoded information relating to a current block of a frame of a first view;

obtaining a first encoded texture block of a first texture picture representing a first view;

obtaining ranging information associated with the first encoded texture block;

deriving disparity information with reference to a reference frame in a second view on the basis of the ranging information;

obtaining reference samples of the second view on the basis of the disparity information;

performing a view synthesis prediction by using the reference samples to obtain a reference block for decoding the first encoded texture block.

In some embodiments the method comprises providing two or more reference views for obtaining the reference block.

In some embodiments the method comprises deriving disparity information to specify spatial coordinates offset between samples of the texture of the current block in the first view and reference samples in the second view.

In some embodiments the method comprises:

using the disparity information for locating reference samples in a texture of the second view; and obtaining predicted sample values on the basis of the located sample values.

In some embodiments of the method the obtaining sample values of the reference area comprises one or more of the following:

filtering the sample values of the texture of the reference view;

filtering the sample values of the texture of the reference view using one or more weighted prediction parameters.

In some embodiments the method comprises using sample values of more than one reference frame in the filtering.

In some embodiments the method comprises using sample values of more than one reference view in the filtering.

In some embodiments the method comprises using a reference VSP frame as the reference frame.

In some embodiments the method comprises producing the reference VSP frame from two or more source frames.

In some embodiments the method comprises producing the reference VSP frame from two or more source views.

In some embodiments the method comprises producing the reference VSP frame by using two or more view synthesis methods.

In some embodiments the method comprises:

producing two or more reference VSP frames from two or more source frames or by using two or more view synthesis methods; and selecting one of the two or more reference VSP frames to be used as the reference VSP frame.

In some embodiments the method comprises providing at least one of the following:

an indication of one or more reference frames;

an indication of one or more view synthesis prediction methods utilized for producing the reference block;

an indication of one or more VSP source frames utilized for producing the reference block.

In some embodiments the method comprises providing at least one of the following:

obtaining the indication from an encoder though a coded bitstream; and deriving refining for indication at the decoder side from previously decoded texture and/or ranging information through a predefined decision making process.

In some embodiments the method comprises applying said indication for decoding a pixel, a block, a slice or a complete texture of a video sequence.

In some embodiments the method comprises providing at least a first reference picture list indicative of pictures used as reference pictures from which the reference block may be selected.

In some embodiments the method comprises using the method in a mobile communication device to encode video information.

In some embodiments of the method the video information is multiview video information.

According to a sixth example there is provided an apparatus comprising at least one processor and at least one memory including computer program code, the at least one memory and the computer program code configured to, with the at least one processor, cause the apparatus to:

obtain a first encoded texture block of a first texture picture representing a first view;

obtain ranging information associated with the first encoded texture block;

derive disparity information with reference to a reference frame in a second view on the basis of the ranging information;

obtain reference samples of the second view on the basis of the disparity information;

perform a view synthesis prediction by using the reference samples to obtain a reference block for decoding the first encoded texture block.

In some embodiments of the apparatus said at least one memory stored with code thereon, which when executed by said at least one processor, further causes the apparatus to provide two or more reference views for the obtaining the reference block.

In some embodiments of the apparatus said at least one memory stored with code thereon, which when executed by said at least one processor, further causes the apparatus to derive disparity information to specify spatial coordinates offset between samples of the texture of the current block in the first view and reference samples in the second view.

In some embodiments of the apparatus said at least one memory stored with code thereon, which when executed by said at least one processor, further causes the apparatus to:

use the disparity information for locating reference samples in a texture of the second view; and obtain predicted sample values on the basis of the located sample values.

In some embodiments of the apparatus wherein the obtaining sample values of the reference area comprises one or more of the following:

filtering the sample values of the texture of the reference view;

filtering the sample values of the texture of the reference view using one or more weighted prediction parameters.

In some embodiments of the apparatus said at least one memory stored with code thereon, which when executed by said at least one processor, further causes the apparatus to use sample values of more than one reference frame in the filtering.

In some embodiments of the apparatus said at least one memory stored with code thereon, which when executed by said at least one processor, further causes the apparatus to use sample values of more than one reference view in the filtering.

In some embodiments of the apparatus said at least one memory stored with code thereon, which when executed by said at least one processor, further causes the apparatus to use a reference VSP frame as the reference frame.

In some embodiments of the apparatus said at least one memory stored with code thereon, which when executed by said at least one processor, further causes the apparatus to produce the reference VSP frame from two or more source frames.

In some embodiments of the apparatus said at least one memory stored with code thereon, which when executed by said at least one processor, further causes the apparatus to produce the reference VSP frame from two or more source views.

In some embodiments of the apparatus said at least one memory stored with code thereon, which when executed by said at least one processor, further causes the apparatus to produce the reference VSP frame by using two or more view synthesis methods.

In some embodiments of the apparatus said at least one memory stored with code thereon, which when executed by said at least one processor, further causes the apparatus to:
  produce two or more reference VSP frames from two or more source frames or by using two or more view synthesis methods; and
  select one of the two or more reference VSP frames to be used as the reference VSP frame.

In some embodiments of the apparatus said at least one memory stored with code thereon, which when executed by said at least one processor, further causes the apparatus to provide at least one of the following:
  an indication of one or more reference frames;
  an indication of one or more view synthesis prediction methods utilized for producing the reference block;
  an indication of one or more VSP source frames utilized for producing the reference block.

In some embodiments of the apparatus said at least one memory stored with code thereon, which when executed by said at least one processor, further causes the apparatus to perform at least one of the following:
  obtaining the indication from an encoder though a coded bitstream; and
  deriving refining for indication at the decoder side from previously decoded texture and/or ranging information through a predefined decision making process.

In some embodiments of the apparatus said at least one memory stored with code thereon, which when executed by said at least one processor, further causes the apparatus to apply said indication for decoding a pixel, a block, a slice or a complete texture of a video sequence.

In some embodiments of the apparatus said at least one memory stored with code thereon, which when executed by said at least one processor, further causes the apparatus to provide at least a first reference picture list indicative of pictures used as reference pictures from which the reference block may be selected.

In some embodiments of the apparatus said at least one memory stored with code thereon, which when executed by said at least one processor, further causes the apparatus to use the method in a mobile communication device to encode video information.

In some embodiments of the apparatus the video information is multiview video information.

According to a seventh example there is provided a computer program product including one or more sequences of one or more instructions which, when executed by one or more processors, cause an apparatus to at least perform the following:

obtain a first encoded texture block of a first texture picture representing a first view;
  obtain ranging information associated with the first encoded texture block;
  derive disparity information with reference to a reference frame in a second view on the basis of the ranging information;
  obtain reference samples of the second view on the basis of the disparity information;
  perform a view synthesis prediction by using the reference samples to obtain a reference block for decoding the first encoded texture block.

In some embodiments the computer program product includes one or more sequences of one or more instructions which, when executed by one or more processors, cause the apparatus to provide two or more reference views for the obtaining the reference block.

In some embodiments the computer program product includes one or more sequences of one or more instructions which, when executed by one or more processors, cause the apparatus to derive disparity information to specify spatial coordinates offset between samples of the texture of the current block in the first view and reference samples in the second view.

In some embodiments the computer program product includes one or more sequences of one or more instructions which, when executed by one or more processors, cause the apparatus to:
  use the disparity information for locating reference sample values in a texture of the second view; and
  obtain predicted sample values on the basis of the located sample values.

In some embodiments of the computer program product the obtaining sample values of the reference area comprises one or more of the following:
  filtering the sample values of the texture of the reference view;
  filtering the sample values of the texture of the reference view using one or more weighted prediction parameters.

In some embodiments the computer program product includes one or more sequences of one or more instructions which, when executed by one or more processors, cause the apparatus to use sample values of more than one reference frame in the filtering.

In some embodiments the computer program product includes one or more sequences of one or more instructions which, when executed by one or more processors, cause the apparatus to use sample values of more than one reference view in the filtering.

In some embodiments the computer program product includes one or more sequences of one or more instructions which, when executed by one or more processors, cause the apparatus to use a reference VSP frame as the reference frame.

In some embodiments the computer program product includes one or more sequences of one or more instructions which, when executed by one or more processors, cause the apparatus to produce the reference VSP frame from two or more source frames.

In some embodiments the computer program product includes one or more sequences of one or more instructions which, when executed by one or more processors, cause the apparatus to produce the reference VSP frame from two or more source views.

In some embodiments the computer program product includes one or more sequences of one or more instructions which, when executed by one or more processors, cause the apparatus to produce the reference VSP frame by using two or more view synthesis methods.

In some embodiments the computer program product includes one or more sequences of one or more instructions which, when executed by one or more processors, cause the apparatus to:

produce two or more reference VSP frames from two or more source frames or by using two or more view synthesis methods; and select one of the two or more reference VSP frames to be used as the reference VSP frame.

In some embodiments the computer program product includes one or more sequences of one or more instructions which, when executed by one or more processors, cause the apparatus to provide at least one of the following:

an indication of one or more reference frames;

an indication of one or more view synthesis prediction methods utilized for producing the reference block;

an indication of one or more VSP source frames utilized for producing the reference block.

In some embodiments the computer program product includes one or more sequences of one or more instructions which, when executed by one or more processors, cause the apparatus to perform at least one of the following:

obtaining the indication from an encoder though a coded bitstream; and deriving refining for indication at the decoder side from previously decoded texture and/or ranging information through a predefined decision making process.

In some embodiments the computer program product includes one or more sequences of one or more instructions which, when executed by one or more processors, cause the apparatus to apply said indication for decoding a pixel, a block, a slice or a complete texture of a video sequence.

In some embodiments the computer program product includes one or more sequences of one or more instructions which, when executed by one or more processors, cause the apparatus to provide at least a first reference picture list indicative of pictures used as reference pictures from which the reference block may be selected.

In some embodiments the computer program product includes one or more sequences of one or more instructions which, when executed by one or more processors, cause the apparatus to use the method in a mobile communication device to encode video information.

In some embodiments of the computer program product includes the video information is multiview video information.

According to an eighth example there is provided an apparatus comprising:

means for obtaining a first encoded texture block of a first texture picture representing a first view;

means for obtaining ranging information associated with the first encoded texture block;

means for deriving disparity information with reference to a reference frame in a second view on the basis of the ranging information;

means for obtaining reference samples of the second view on the basis of the disparity information;

means for performing a view synthesis prediction by using the reference samples to obtain a reference block for decoding the first encoded texture block.

According to a ninth example there is provided a video coder configured for:

obtaining a first uncompressed texture block of a first texture picture representing a first view;

obtaining ranging information associated with the first uncompressed texture block;

deriving disparity information with reference to a reference frame in a second view on the basis of the ranging information;

obtaining reference samples of the second view on the basis of the disparity information;

performing a view synthesis prediction by using the reference samples to obtain a reference block for encoding the first uncompressed texture block.

According to a tenth example there is provided a video decoder configured for:

obtaining a first encoded texture block of a first texture picture representing a first view;

obtaining ranging information associated with the first encoded texture block;

deriving disparity information with reference to a reference frame in a second view on the basis of the ranging information;

obtaining reference samples of the second view on the basis of the disparity information;

performing a view synthesis prediction by using the reference samples to obtain a reference block for decoding the first encoded texture block.

The invention claimed is:

1. A method comprising:
   obtaining a first coded depth picture representing a first view;
   reconstructing a first decoded depth picture based on the first coded depth picture;
   obtaining a first texture block of a first texture picture representing the first view;
   obtaining, from the first decoded depth picture, ranging information associated with the first texture block, wherein obtaining ranging information comprises at least one of the following:
   reconstructing or decoding the first decoded depth picture representing the first view and obtaining said ranging information from the first decoded depth picture;
   obtaining said ranging information from depth pictures preceding the first texture picture in coding order; or
   obtaining said ranging information from texture blocks preceding the first texture block in coding order;
   deriving block-wise disparity information with reference to a reference picture in a second view on the basis of the ranging information;
   obtaining a location of a reference block of the second view using the block-wise disparity information as spatial coordinates offset from a location of the first texture block; and
   obtaining the reference block, using view synthesis prediction, comprising reference samples for performing at least one of the following: encoding the first texture block; or decoding the first texture block;
   using the disparity information for locating the reference samples in the reference picture;
   obtaining reference sample values for the reference block on the basis of the located reference samples;
   filtering the reference sample values; and
   filtering the reference sample values using one or more weighted prediction parameters.

2. The method according to claim 1 comprising
   deriving disparity information with reference to a second reference picture in a third view on the basis of the ranging information;
   obtaining reference samples of the third view on the basis of the disparity information; and using the reference samples of the second view and the reference samples of the third view to obtain the reference block.

3. The method according to claim 1 comprising deriving disparity information to specify spatial coordinates offset between samples of the first texture block and the reference samples.

4. The method according to claim 1 comprising providing at least a first reference picture list indicative of pictures used as reference pictures from which the reference block is selected.

5. The method according to claim 1 further comprising processing of the ranging information or the disparity information in at least one of the following ways:
  filtering the ranging information or the disparity information;
  subsampling the ranging information or the disparity information; or
  deriving one disparity value from the ranging information or the disparity information.

6. An apparatus comprising at least one processor and at least one memory including computer program code, the at least one memory and the computer program code configured to, with the at least one processor, cause the apparatus to:
  obtain a first coded depth picture representing a first view;
  reconstruct a first decoded depth picture based on the first coded depth picture;
  obtain a first texture block of a first texture picture representing the first view;
  obtain, from the first decoded depth picture, ranging information associated with the first texture block by at least one of the following:
  reconstructing or decoding the first decoded depth picture representing the first view and obtaining said ranging information from the first decoded depth picture;
  obtaining said ranging information from depth pictures preceding the first texture picture in coding order; or
  obtaining said ranging information from texture blocks preceding the first texture block in coding order;
  derive block-wise disparity information with reference to a reference picture in a second view on the basis of the ranging information;
  obtain a location of a reference block of the second view using the block-wise disparity information as spatial coordinates offset from a location of the first texture block; and
  obtain the reference block, using view synthesis prediction, comprising reference samples for performing at least one of the following:
  encoding the first texture block; or
  decoding the first texture block;
  use the disparity information for locating the reference samples in the reference picture;
  obtain reference sample values for the reference block on the basis of the located reference samples;
  filter the reference sample values; and
  filter the reference sample values using one or more weighted prediction parameters.

7. The apparatus according to claim 6 said at least one memory stored with code thereon, which when executed by said at least one processor, further causes the apparatus to
  derive disparity information with reference to a second reference picture in a third view on the basis of the ranging information;
  obtain reference samples of the third view on the basis of the disparity information; and
  use the reference samples of the second view and the reference samples of the third view to obtain the reference block.

8. The apparatus according to claim 6, said at least one memory stored with code thereon, which when executed by said at least one processor, further causes the apparatus to derive disparity information to specify spatial coordinates offset between samples of the first texture block and the reference samples.

9. The apparatus according to claim 6, said at least one memory stored with code thereon, which when executed by said at least one processor, further causes the apparatus to provide at least a first reference picture list indicative of pictures used as reference pictures from which the reference block is selected.

10. The apparatus according to claim 6, said at least one memory stored with code thereon, which when executed by said at least one processor, further causes the apparatus to process of the ranging information or the disparity information in at least one of the following ways:
  filtering the ranging information or the disparity information;
  subsampling the ranging information or the disparity information; or
  deriving one disparity value from the ranging information or the disparity information.

11. A computer program product embodied on a non-transitory computer-readable medium including one or more sequences of one or more instructions which, when executed by one or more processors, cause an apparatus to at least perform the following:
  obtain a first coded depth picture representing a first view;
  reconstruct a first decoded depth picture based on the first coded depth picture;
  obtain a first texture block of a first texture picture representing the first view;
  obtain, from the first decoded depth picture, ranging information associated with the first texture block by at least one of the following:
  reconstructing or decoding the first decoded depth picture representing the first view and obtaining said ranging information from the first decoded depth picture;
  obtaining said ranging information from depth pictures preceding the first texture picture in coding order; or
  obtaining said ranging information from texture blocks preceding the first texture block in coding order;
  derive block-wise disparity information with reference to a reference picture in a second view on the basis of the ranging information;
  obtain a location of a reference block of the second view using the block-wise disparity information as spatial coordinates offset from a location of the first texture block; and
  obtain the reference block, using view synthesis prediction, comprising reference samples for performing at least one of the following:
  encoding the first texture block; or
  decoding the first texture block;
  use the disparity information for locating the reference samples in the reference picture;
  obtain reference sample values for the reference block on the basis of the located reference samples;
  filter the reference sample values; and
  filter the reference sample values using one or more weighted prediction parameters.

12. The computer program product embodied on the non-transitory computer-readable medium according to claim 11 including one or more sequences of one or more instructions which, when executed by one or more processors, cause the apparatus to
- derive disparity information with reference to a second reference picture in a third view on the basis of the ranging information;
- obtain reference samples of the third view on the basis of the disparity information; and
- use the reference samples of the second view and the reference samples of the third view to obtain the reference block.

13. The computer program product embodied on the non-transitory computer-readable medium according to claim 11 including one or more sequences of one or more instructions which, when executed by one or more processors, cause the apparatus to derive disparity information to specify spatial coordinates offset between samples of the first texture block and the reference samples.

14. The computer program product embodied on the non-transitory computer-readable medium according to claim 11 including one or more sequences of one or more instructions which, when executed by one or more processors, cause the apparatus to provide at least a first reference picture list indicative of pictures used as reference pictures from which the reference block is selected.

15. The computer program product embodied on the non-transitory computer-readable medium according to claim 11 including one or more sequences of one or more instructions which, when executed by one or more processors, cause the apparatus to process of the ranging information or the disparity information in at least one of the following ways:
- filtering the ranging information or the disparity information;
- subsampling the ranging information or the disparity information; or
- deriving one disparity value from the ranging information or the disparity information.

16. A video encoder configured for:
- obtaining a first coded depth picture representing a first view;
- reconstructing a first decoded depth picture based on the first coded depth picture;
- obtaining a first texture block of a first texture picture representing the first view;
- obtaining, from the first decoded depth picture, ranging information associated with the first texture block, wherein obtaining ranging information comprises at least one of the following:
- reconstructing or decoding the first decoded depth picture representing the first view and obtaining said ranging information from the first decoded depth picture;
- obtaining said ranging information from depth pictures preceding the first texture picture in coding order; or
- obtaining said ranging information from texture blocks preceding the first texture block in coding order;
- deriving block-wise disparity information with reference to a reference picture in a second view on the basis of the ranging information;
- obtaining a location of a reference block of the second view using the block-wise disparity information as spatial coordinates offset from a location of the first texture block; and
- obtaining the reference block, using view synthesis prediction, comprising reference samples for encoding the first texture block;
- using the disparity information for locating the reference samples in the reference picture;
- obtaining reference sample values for the reference block on the basis of the located reference samples;
- filtering the reference sample values; and
- filtering the reference sample values using one or more weighted prediction parameters.

* * * * *